United States Patent [19]
Yoshinaga et al.

[11] Patent Number: 5,392,172
[45] Date of Patent: Feb. 21, 1995

[54] MAGNETIC HEAD CIRCUIT HAVING A WRITE CURRENT CHANGEOVER CIRCUIT WITH A CLAMP VOLTAGE DEPENDING ON WRITE CURRENT FOR HIGH-SPEED DATA TRANSFER

[75] Inventors: Masaki Yoshinaga, Tachikawa; Noriaki Hatanaka, Chigasaki; Tomoaki Hirai, Odawara; Yuji Nagaya; Tsuyoshi Hirose, both of Ome; Tadao Kaji, Tokyo, all of Japan

[73] Assignee: Hitachi, Ltd., Tokyo, Japan

[21] Appl. No.: 10,146

[22] Filed: Jan. 28, 1993

[30] Foreign Application Priority Data
Jan. 30, 1992 [JP] Japan .................................. 4-040131

[51] Int. Cl.⁶ .......................... G11B 5/02; G11B 5/09
[52] U.S. Cl. ........................................ 360/67; 360/46
[58] Field of Search ................... 360/67, 46, 65, 66, 360/68; 330/260; 328/167

[56] References Cited

U.S. PATENT DOCUMENTS

| | | | |
|---|---|---|---|
| 4,644,424 | 2/1987 | Nishiyama et al. | 360/65 |
| 4,706,138 | 11/1987 | Jove et al. | 360/67 |
| 4,743,861 | 5/1988 | Jove et al. | 330/260 |
| 4,786,993 | 11/1988 | Jove et al. | 360/67 |
| 4,914,398 | 4/1990 | Jove et al. | 328/167 |

FOREIGN PATENT DOCUMENTS

| | | |
|---|---|---|
| 60-136910 | 7/1985 | Japan . |
| 60-201505 | 10/1985 | Japan . |
| 61-42706 | 3/1986 | Japan . |
| 61-170909 | 8/1986 | Japan . |
| 61-178779 | 8/1986 | Japan . |
| 62-273609 | 11/1987 | Japan . |
| 63-257903 | 10/1988 | Japan . |
| 3-104006 | 5/1991 | Japan . |

OTHER PUBLICATIONS

"Magnetic Recording Channel Front-Ends", IEEE Transactions on Magnetics, vol. 27, No. 6, 1991, K. B. Klassen, pp. 4503-4508.

Primary Examiner—John Shepperd
Assistant Examiner—Patrick Wamsley
Attorney, Agent, or Firm—Fay, Sharpe, Beall, Fagan, Minnich & McKee

[57] ABSTRACT

A magnetic head circuit for a plurality of magnetic heads includes two emitter follower transistors for receiving magnetic head writing data, two differential transistors connected to the two emitter follower transistors for performing differential operation control thereover, and two resistors connected to collectors of the two differential transistors for supplying a base current to the two emitter follower transistors, and wherein the emitter follower transistors are connected in series with each other to perform differential switch operations over a magnetic head writing current. A magnetic head fly-back voltage has a clamp voltage which varies according to a writing current flowing through a pair of signal terminals. A pair of differential transistors, whose bases are connected to the pair of signal terminals and whose emitters are connected directly to each other, are operated according to a voltage appearing between the pair of signal terminals. Connected to the collectors of the pair of differential transistors are amplification transistors respectively. Connected to outputs of the amplification transistors are post-amplifiers. Such a connection configuration provides a small mirror capacitance as viewed from the bases of the amplification transistors. A high writing and reading accessing speed to the magnetic heads can be realized.

25 Claims, 16 Drawing Sheets

F I G. 1
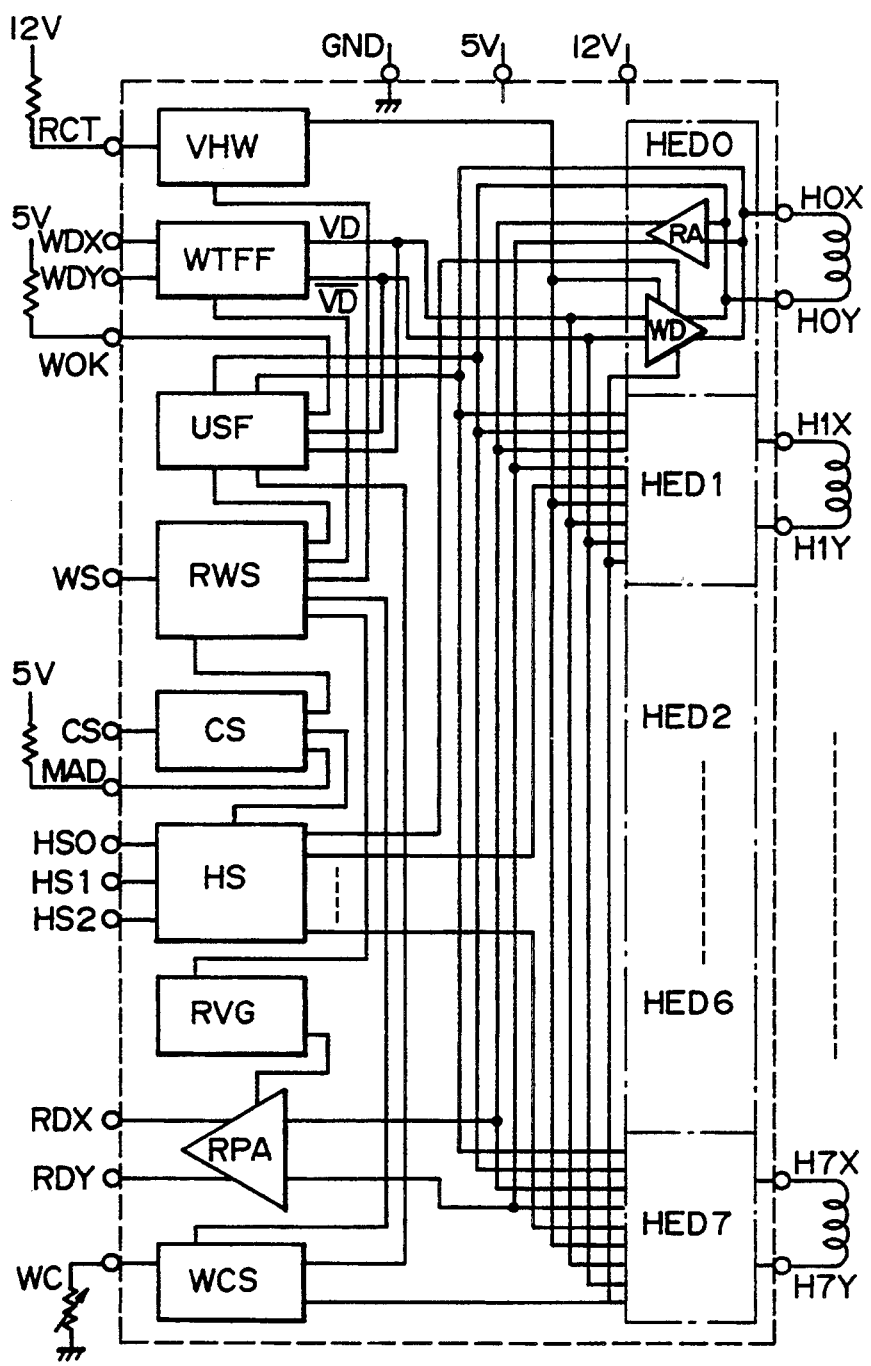

CURRENT OVERSHOOT

WRITE DRIVER WD

WRITE DRIVER WD

F I G. 14
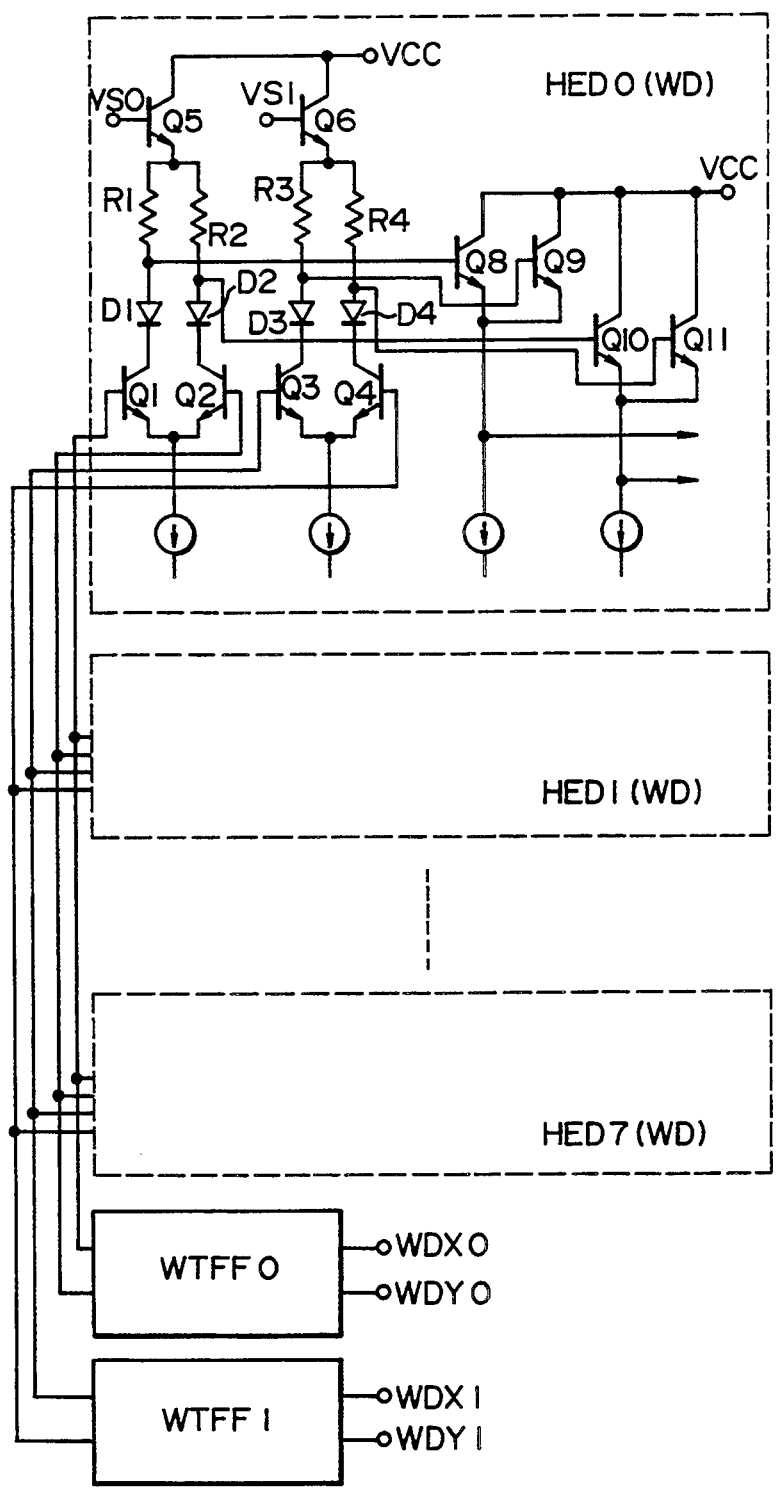

OUTPUT CIRCUIT OA OF READ POST-AMPLIFIER RPA

F I G. 19
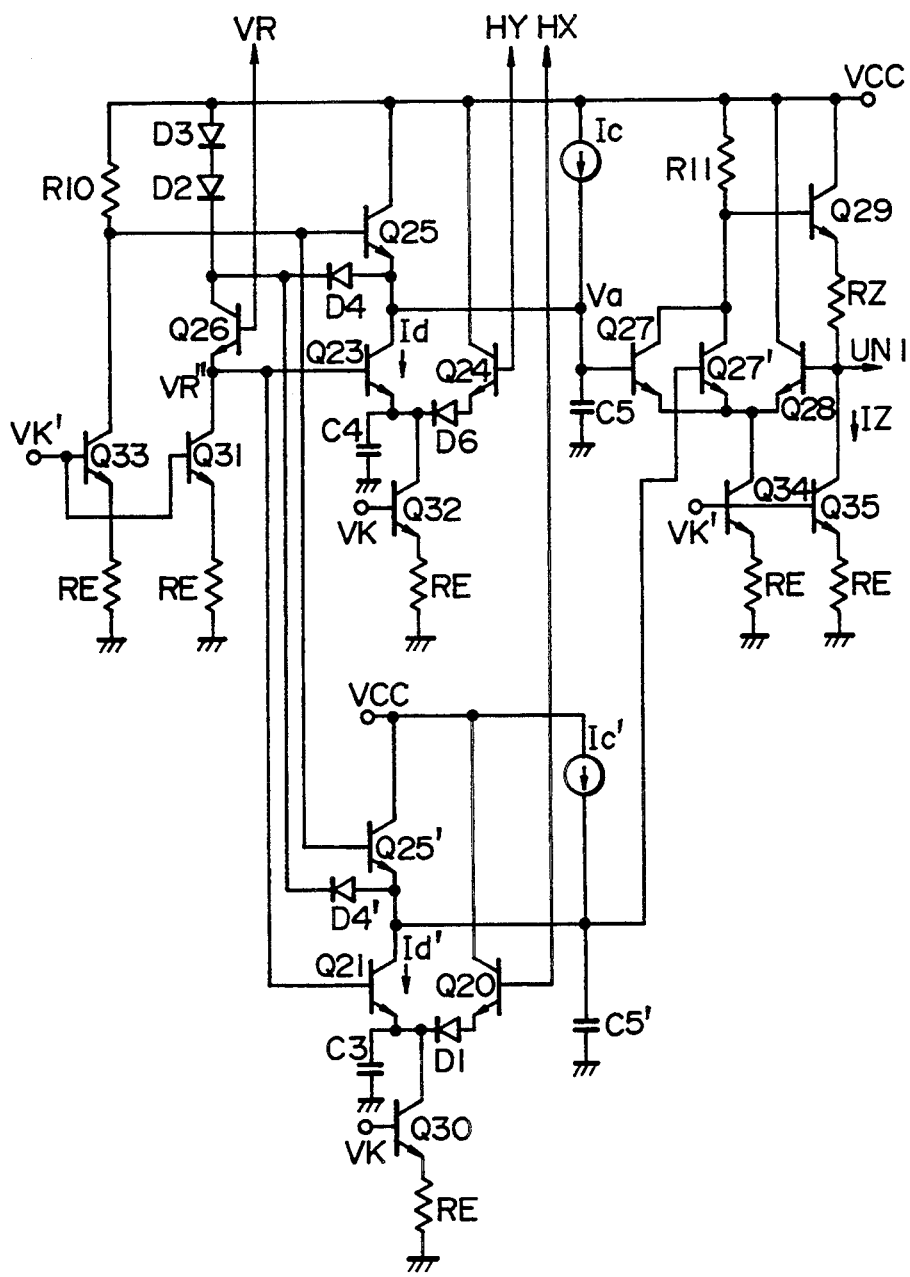

MAGNETIC HEAD CIRCUIT HAVING A WRITE CURRENT CHANGEOVER CIRCUIT WITH A CLAMP VOLTAGE DEPENDING ON WRITE CURRENT FOR HIGH-SPEED DATA TRANSFER

BACKGROUND OF THE INVENTION

The present invention relates to a magnetic head circuit, a magnetic disk unit having a read/write integrated circuit for driving a magnetic head, and a magnetic disk control method.

Examples of known magnetic head driving circuits are disclosed in K. B. Klassen, "MAGNETIC RECORDING CHANNEL FRONT-ENDS", IEEE TRANSACTIONS ON MAGNETICS, Vol. 27, No. 6, November 1991, pp. 4503–4508; U.S. Pat. No. 4,706,138, U.S. Pat. No. 4,786,993, U.S. Pat. No. 4,743,861, and U.S. Pat. No. 4,914,398; and JP-A-62-273609, JP-A-60-201505 and JP-A-63-257903. Examples of known magnetic-head-abnormality detection circuits are described in JP-A-60-136910, JP-A-61-178779, JP-A-61-170909, and JP-A-Hei-3-104006. An example of known reading circuits is given in JP-A-61-42706.

Higher memory capacity, higher data transfer rate, smaller size and higher reliability in magnetic disk units have increasingly been demanded. For meeting such demands, the inventors of the present application have again examined and investigated the so-called read/write integrated circuit for driving a magnetic head. As a result of the reexamination, the inventors have found various requirements for higher speed write system circuits to attain a higher data transfer rate, for higher speed read system circuits for larger memory capacity, for protection of elements from the higher voltage required for meeting higher speed requirements, and also for detecting an abnormality in the magnetic head with high accuracy, which requirements must be satisfied.

SUMMARY OF THE INVENTION

It is an object of the present invention to provide a magnetic head circuit including write system circuits which can suppress the current overshoot caused by the fly-back of a head coil due to a change in the writing data level, can shorten rise and fall times in the writing current to thereby allow a high-speed writing operation, and to provide a magnetic disk unit and a magnetic disk read/write control method.

Another object of the present invention is to provide a magnetic head circuit including read system circuits which can reduce the input capacitance of a read amplifier which receives the output of a head to thereby allow a high-speed reading operation, and also to provide a magnetic disk unit and a magnetic disk read/write control method.

A further object of the present invention is to provide a magnetic head circuit including a detection circuit which can detect an abnormality (such as an excessive current or a broken line) in a magnetic head with high accuracy during a high-speed reading/writing operation, and also to provide a magnetic disk unit and a magnetic disk read/write control method.

Yet a further object of the present invention is to provide a magnetic head circuit having two system read paths for a large capacity disk which can reduce the change-over time between a plurality of heads, and also to provide a magnetic disk unit and a magnetic disk control method.

Another object of the present invention is to provide a high-speed disk unit in which the rise time for a writing current can be set to be substantially equal to the fall time for the writing current, and the duty cycle of changes in a pair of currents can be set to be nearly 50%.

The above and other objects and novel features of the present invention will be obvious from the following detailed explanation in conjunction with the attached drawings.

In accordance with an aspect of the present invention, a write-current change-over circuit for switching the direction of a current to be supplied to a magnetic head in response to write data has a means for providing a write current dependency to a clamp voltage for suppressing a fly-back voltage generated in the coil of the magnetic head at the time of switching the current direction. In a recording/reproducing circuit connected to the magnetic heads, a series of clamping diodes may be connected between the base and emitter of differential amplification transistors receiving a read signal from each of the magnetic heads. First common-base amplification transistors which receive their input signals at their emitters are provided to be connected close to the collectors of the differential amplification transistors receiving the read signal from the magnetic head, and second common-base amplification transistors which receive their input signals at their emitters are provided to be connected close to a reading output circuit OA disposed at a location relatively spaced from the first differential transistors.

There are further provided amplification circuits for amplifying the associated read signal, an emitter follower output circuit for receiving am amplification output signal from the amplification circuits to generate an output signal and provide it to an external terminal, a plurality of read circuits corresponding in number to a plurality of magnetic heads for selectively switching between the operating voltage of the amplification circuit and the operating current of the emitter follower output circuit according to chip select signals, and a current adjustment circuit for performing adjustment of offset voltages of amplification circuits of the read circuits to output a signal of one of these read circuits selected by head selection signals. A broken line condition is detected on the basis of a delay difference between fly-back voltages of the terminals of the magnetic head with respect to the write data. An output signal of a voltage comparison circuit for receiving the fly-back voltage and a predetermined reference voltage lower than the terminal voltage determined by a DC voltage drop based on the write current flowing to the magnetic head in its normal state is smoothed to obtain a smoothed signal, and a short circuiting or fixed data are detected on the basis of the smoothed signal.

With such an arrangement as mentioned above, since the clamp voltage for suppressing the fly-back voltage has a head-write-current dependency, the change-over of the write current can be realized at high speed while suppressing a write current overshoot. Since insertion of clamping diodes connected in series causes limitation of the base-to-emitter voltage of the reading differential amplification transistors, the deterioration of characteristics and element destruction can be prevented. When two-stage common-base amplification transistors which receive their input signals at their emitters are connected in two-stage cascade, good signal transmission paths can be obtained. The change-over of the operating current of the amplification transistors enables the emitter follower output circuit to have a 3-state output function. These outputs are coupled on a direct wired logic basis. A delay between the two terminal potentials of the magnetic head with respect to the write input data is utilized to detect the break of the head wiring independently of the frequency of the write data. When a difference between the fly-back voltages in the normal state and in the short-circuited state is utilized, a short-circuited state can be detected.

BRIEF DESCRIPTION OF THE DRAWINGS

FIG. 1 is a block diagram of a magnetic head circuit in accordance with an embodiment of the present invention;

FIG. 14 is a circuit diagram of an example of a write system circuit in the present invention;

FIG. 19 is a circuit diagram of an example of a short-circuit detection circuit contained in the unsafety detection circuit USF of the magnetic head circuit of the present invention.

DESCRIPTION OF THE PREFERRED EMBODIMENTS

Figure 2:
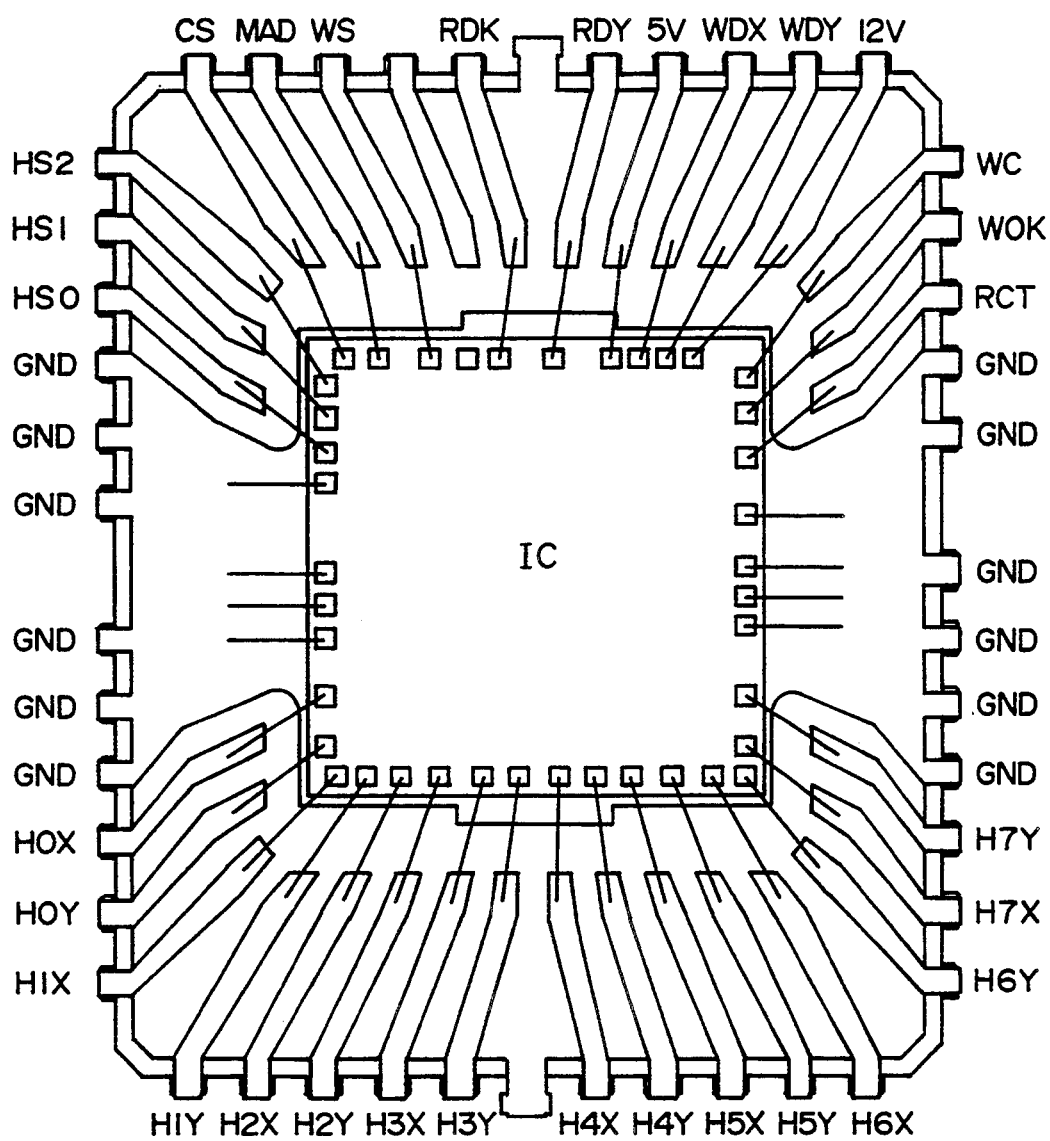
FIG. 2 is a pin array of an example of a read/write integrated circuit in the embodiment of FIG. 1.

Referring first to FIG. 1, there is shown a block diagram of a magnetic head circuit in accordance with an embodiment of the present invention, in which circuit blocks are formed on a single semiconductor substrate of, for example, single crystalline silicon by known techniques for fabricating semiconductor integrated circuits. The magnetic head circuit of the present embodiment is called a magnetic-head read/write integrated circuit and is used in a magnetic hard or rigid disk unit. Connectable to the hard disk unit are up to 9 magnetic heads and correspondingly up to 8 head circuits. As shown in FIG. 1, a typical head circuit HED0 comprises a read pre-amplifier RA and a write driver WD. More specifically, a pair of input terminals of the read pre-amplifier RA and a pair of output terminals of the write driver WD are commonly connected to a pair of head terminals H0X and H0Y. In the drawing, other head circuits HED1 to HED7 are shown as black boxes have each the same configuration as the aforementioned head circuit HED0.

In the present embodiment, one read post-amplifier RPA and one frequency divider or count-down circuit WTFF for data input or writing are provided for the above 8 head circuits HED0 to HED7. This known frequency divider may be a flip-flop which outputs write data having a frequency corresponding to half that of an input signal.

More in detail, the respective outputs of the read pre-amplifiers RA of the head circuits HED0 to HED7 are commonly connected to the respective inputs of the aforementioned read post-amplifier RPA. Read output signals amplified by the read post-amplifier RPA are output from terminals RDX and RDY. Output signals of the frequency divider WTFF for data writing are commonly sent to respective inputs of the write drivers WD of the head circuits HED0 to HED7 so that one of the write drivers corresponding to one of the magnetic heads selected by a selection signal including outputs of a head selector HS and a read/write selector RWS is put in its active condition, whereby the associated magnetic head is driven.

When input signals to terminals WDX and WDY of the frequency divider WTFF (providing the output signals to the associated head) are previously set to have respectively a frequency corresponding to their intended frequency, the frequency divider WTFF can be omitted. In this case, however, write data are applied to the write data terminals WDX and WDY of the frequency divider WTFF. The write data are counted down or frequency-divided by the frequency divider WTFF and then supplied to the write drivers WD of the head circuits HED0 to HED7.

At this time, a chip select signal and a write select signal are input respectively from terminals CS and WS, while 3-bit head select signals are input respectively from terminals HS0 to HS2. The input of the chip select signal causes a chip selector CS to generate activation signals which are then received at the read/write selector RWS and head selector HS. This causes the read/write selector RWS and head selector HS to be activated to accept and decode the above signals for selecting one of the head circuits. In the writing operation, one write driver is put in its active state. Such a chip selection condition can be externally monitored through an abnormality detection terminal MAD at which an abnormality detection signal appears when two or more chips are wrongly selected. The direction of a write current generated at a write current source circuit WCS and supplied to the associated magnetic head is inverted according to the write data transmitted from the frequency divider WTFF. In the write current source circuit WCS, the write current value is changed based on the adjusted resistance value of a variable resistor RWC connected at its external terminal WC. A write amplifier voltage source VHW generates a voltage for operating the write driver. In the illustrated embodiment, although not specifically limited, for the purpose of power saving of the write amplifier a series circuit of a resistor and the VHW circuit (e.g., transistor) for generation of a head voltage in the write mode are inserted between a power source voltage (12 V) and a power source voltage of the write-system transistor circuit. A voltage for the write amplifier is supplied from a terminal RCT to the write amplifier voltage source VHW. Accordingly, a voltage of, e.g., about 7 V can be supplied to the terminal RCT.

Selection of one of the head circuits is carried out by means of the chip select signal and head select signals supplied from the terminals CS and HS0 to HS2. When a reading operation is instructed by the write select signal supplied from the terminal WS, only the read pre-amplifier RA of the selected head circuit is activated and the then-activated read post-amplifier RPA outputs read signals from the terminals RDX and RDY. A read temperature compensation voltage source RVG generates a voltage compensated for temperature for operating the read post-amplifier RPA. The circuit RVG is operated only when informed of a reading operation by the read/write selector RWS. The read post-amplifier RPA is also operated only in the reading operation under control of the circuit RVG.

An unsafety detection circuit USF detects a broken line or a short-circuit in the magnetic heads. For detecting such a broken line or short-circuit the write data and a terminal voltage across each magnetic head are used. An output signal of the unsafety detection circuit USF is issued from a terminal WOK to indicate whether or not the write mode is o.k. A pull-up resistor is provided to the terminal WOK at which the output signal of the unsafety detection circuit USF having a high level (though not specifically limited thereto) appears when the circuit USF detects such an abnormality as a broken line or a short-circuit.

Shown in FIG. 2 is a pin array of an example of the aforementioned read/write integrated circuit. Internal circuits are provided close to associated pins. In the drawing, more specifically, a semiconductor chip is divided roughly into two upper and lower halves. Provided to the lower half are the head circuits HED0 to HED7 of the 8 magnetic heads as associated with the respective terminals H0X, H0Y to H7X and H7Y.

Arranged to the upper half of the chip are the head selector HS, chip selector CS, read/write selector RWS, read post-amplifier RPA, frequency divider WTFF, etc. as aligned with the pin array. In the present embodiment, interconnection between the read pre-amplifiers RA of the head circuits HED0 to HED7 and the read post-amplifier RPA for receiving the output signals therefrom is established by means of relatively long lines wired vertically transversely on the chip. Similarly, interconnection between the outputs of the frequency divider WTFF and the inputs of the write drivers WD of the head circuits HED0 to HED7 is also established by means of relatively long lines wired vertically transversally on the chip.

Figure 3:
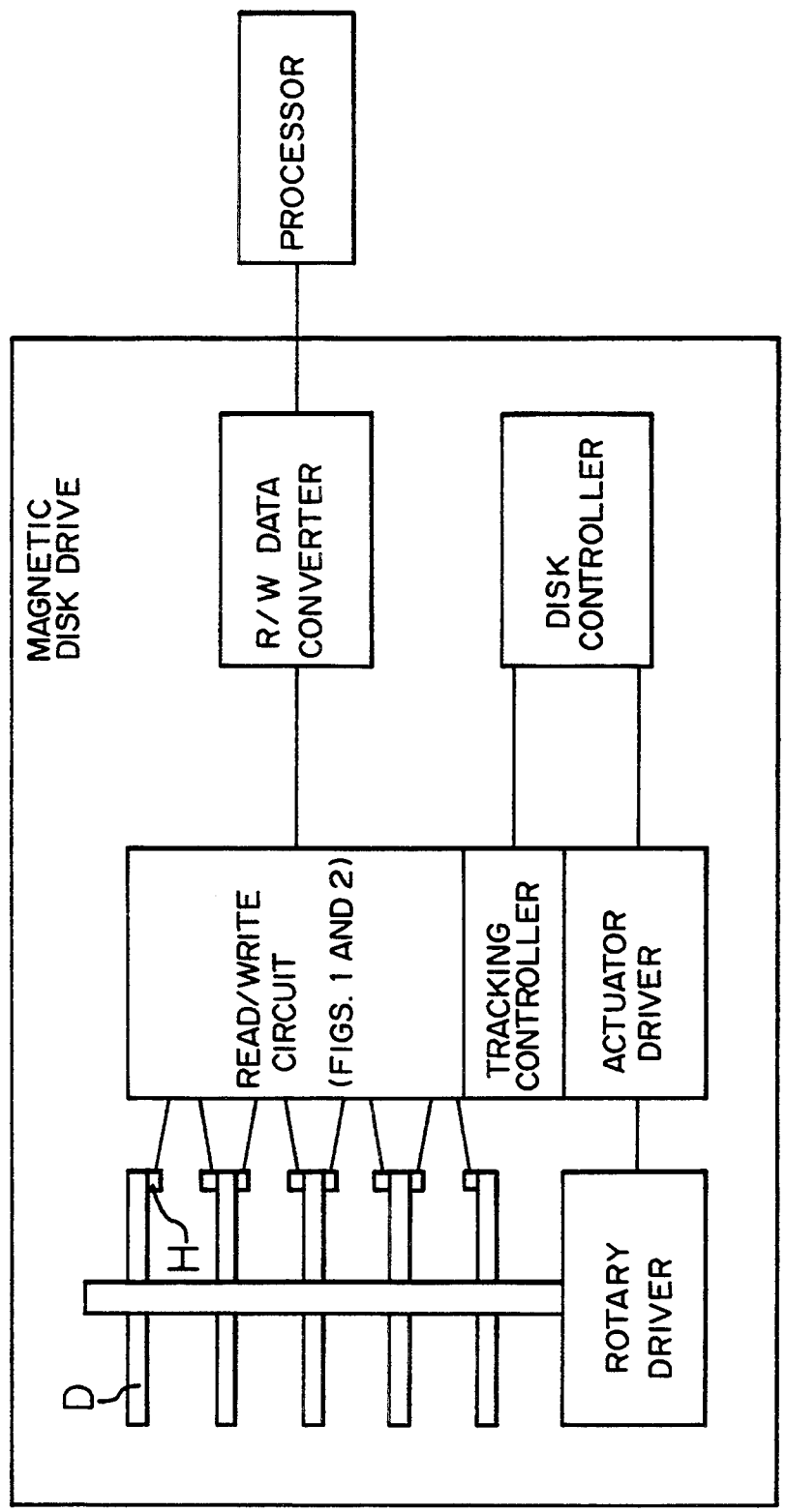
FIG. 3 is a block diagram of a disk unit of the present invention.

FIG. 3 illustrates a magnetic disk unit which can perform a high-speed reading/writing operation. More specifically, a rotary driver for rotating disks D is connected to an actuator driver. A read/write circuit connected to heads H, which has the same structure as the read/write circuit of FIG. 1, is connected to a read/write data converter. In this converter, data serial/parallel conversion and waveform shaping are carried out for data transfer (input/output) between a processor and a CPU. A tracking controller for controlling the seeking operation of the heads as well as the actuator driver are controlled by a disk controller.

Figure 4:
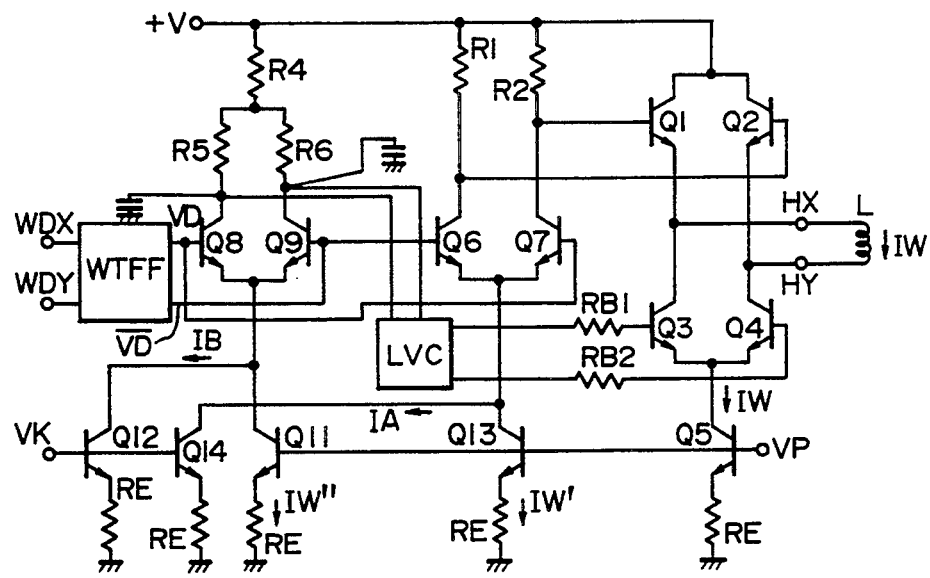
FIG. 4 is a specific circuit diagram of an example of a write driver WD in the present invention.

There is shown in FIG. 4 a specific circuit diagram of an example of the write driver. In this example, a clamp voltage for suppressing a fly-back voltage caused by a counter-electromotive force in a magnetic head connected to terminals HX and HY is dependent on writing current, as will be explained later. A relationship between a fly-back voltage $V_f$ applied to both ends of a coil of a magnetic head and an inductance L of the coil is given by the following equation (1).

$$V_f = L \cdot di/dt \quad (1)$$

From the equation (1), a relationship $\Delta t = L \cdot \Delta i / V$ is derived. For higher speed operation, it is necessary to make the quantity $\Delta t$ smaller. In order to make the quantity $\Delta t$ smaller, the quantity i must be made smaller. When writing current i is made small, however, overshoot is undesirably increased as inversely proportional thereto. Thus, it is desirable to change the writing current for writing data into the outer and inner peripheries of the disk. As the writing current is increased, a current rise time $t_r$ and a current fall time $t_f$ also vary. In the prior art, in order to satisfy both contrary requirements of the rise and fall times $t_r$ and $t_f$ and overshoot, the head writing current must be selected within a very narrow range, which unsatisfactorily leads to the fact that an operational margin is small. In the illustrated embodiment, for the purpose of obtaining a write driver that can provide substantially constant rise and fall times $t_r$ and $t_f$ and overshoot with respect to a wide range of writing current $I_w$ based on the specifications of the magnetic head, and in other words, for the purpose of enabling the writing operation with the optimum writing current leading to the high performance of the magnetic head, a clamp voltage $V_c I_{w'} \cdot R_2 + I_4 \cdot R_2$ contains a product of $I_{w'}$ and $R_2$ and is dependent on the writing current. In the circuit of FIG. 4, collector currents $I_{w'}$ and $I_w$ flowing through transistors Q13 and Q5 whose bases are commonly connected have a substantially proportional relationship therebetween.

The terminals HX and HY are connected at one side with the magnetic head, and also connected at the other side with a pair of emitter follower output transistors Q1 and Q2 at their emitters and also with a pair of current change-over differential transistors Q3 and Q4 at their collectors. These transistors Q1 to Q4 forming a bridge circuit are controlled in such a manner that the transistors Q1 and Q3 corresponding to the terminal HX and the transistors Q2 and Q4 corresponding to the terminal HY are controllably switched complementarily according to the writing data, whereby the direction of the writing current $I_w$ flowing through the magnetic head connected to the terminals HX and HY is switched. That is, when the transistors Q1 and Q4 are activated, the writing current $I_w$ flows from the terminal HX to the terminal HY; whereas when the transistors Q2 and Q3 are activated, the writing current $I_w$ flows from the terminal HY to the terminal HX. The writing current $I_w$ is generated by the constant-current transistor Q5 receiving a voltage VP. Connected to the emitter of the transistor Q5 is an emitter resistor RE.

Writing data entered from the terminals WDX and WDY are received at the frequency divider WTFF. One of the output signals of the frequency divider WTFF is sent to the bases of the differential transistors Q6 and Q7 whose collectors are connected with load resistors R1 and R2 respectively. Connected to the common emitters of the differential transistors Q6 and Q7 is a current source circuit for supplying an operating current (which will be explained later). Collector output signals of the differential transistors Q7 and Q6 are applied to the bases of the aforementioned emitter follower output transistors Q1 and Q2 respectively. The other output signal of the above frequency divider WTFF is applied to the bases of transistors Q8 and Q9 whose collectors are connected with load resistors R5 and R6 respectively. Also commonly connected to power-supply side terminals of the load resistors R5 and R6 is a level shifting resistor R4.

Connected to the common emitters of the differential transistors Q8 and Q9 is an operating-current source circuit to be explained later. Collector output signals of the differential transistors Q8 and Q9 are applied through a level shift circuit LVC to the bases of the differential transistors Q3 and Q4 for current changeover, so that signals with suitable voltage level differences therebetween are applied to the bases of the transistors Q1 and Q2, whereby a difference in switching speed between the transistor pair is adjusted.

Provided to the bases of the transistors Q3 and Q4 are base resistors RB1 and RB2. In the illustrated embodiment, in order to provide a writing current dependency to the clamp voltage as mentioned above, as the operating-current source circuit provided to the emitters of the differential transistors Q6 and Q7, a transistor Q13 receiving at the gate thereof the constant voltage VP used for generation of the above writing current IW is provided in parallel to a transistor Q14 which receives a constant voltage VK and through which a constant current IA flows. An emitter resistor RE is connected to the emitter of each of the constant-current transistors Q13 and Q14. The emitter resistor RE is a general representation of an emitter resistor of a constant-current transistor, and thus this does not always mean that all the emitter resistors RE have an identical resistance value.

There flows through the transistor Q13 the adjustment current IW' corresponding to the writing current IW adjusted according to the adjustment of the voltage VP, i.e., or to the control of the inner/outer peripheries or the emitter size ratio between the transistors Q5 and Q13 and the emitter resistor RE ratio. Through the differential transistors Q6 and Q7 flows a combined current of the constant currents IA and IW'. As a result, the collector voltage of the differential transistor Q6 or Q7 which is turned ON according to the writing data, becomes dependent on the current IW' proportional to the writing current IW.

As in the above, even in the operating-current source circuit provided to the emitters of the differential transistors Q8 and Q9, the transistor Q11 receiving the constant voltage VP at the base thereof for generation of the writing current IW is provided in parallel to the transistor Q12 which receives the constant voltage VK and through which a constant current IB flows. An emitter resistor RE is connected to the emitter of each of the constant-current transistors Q11 and Q12. The emitter resistor RE is a general representation of an emitter resistor of a constant-current transistor as mentioned above, and thus does not represent that all the emitter resistors RE have an identical resistance value.

There flows through the transistor Q11 an adjustment current IW''' corresponding to the writing current IW adjusted according to the adjustment of the voltage VP, i.e., the control of the inner/outer peripheries or the emitter size ratio between the transistors Q5 and Q11 and the emitter resistor RE ratio. Through the differential transistors Q8 and Q9 flows a combined current of the constant currents IB and IW'''. As a result, the amplitude of the collector signal of the differential transistor Q8 or Q9 which is turned ON according to the writing data, becomes dependent on the current IW'''. In the differential transistors Q3 and Q4 for current change-over, the base current increases with the increased writing current IW. As a result, voltage losses or drops across the resistors RB1 and RB2 cause the input signal amplitudes of the differential transistors Q3 and Q4 to become small. Thus, when such a writing current dependency as stated above is provided even to the operating currents of the differential transistors Q8 and Q9, the output signal amplitude is made large in response to an increase in the writing current IW, whereby the voltage losses across the base resistors RB1 and RB2 are compensated for.

Figure 5:
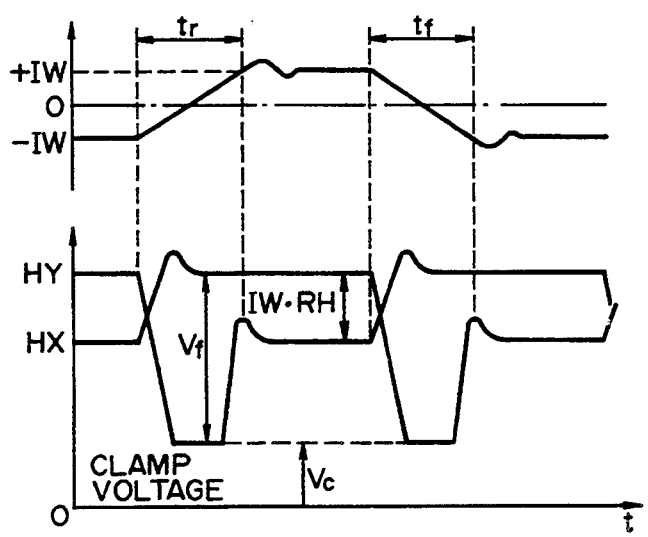
FIG. 5 shows waveforms of a writing current IW and voltages HX and HY on both ends of a magnetic head coil.

Shown in FIG. 5 is an example of waveforms of the writing current IW and voltages on both ends HX and HY of the magnetic head. Assume now that the differential transistor Q6 is in its OFF state and the differential transistor Q7 is in its ON state according to the writing data. Then the differential transistor Q6 in the OFF state has an operating voltage of substantially +V at its collector so that a current is supplied from the emitter follower output transistor Q2. At this time, the other differential transistors Q8 and Q9 and the level shift circuit LVC cause the current switching differential transistor Q3 to be turned ON and the differential transistor Q4 to be turned OFF. This results in that such a writing current −IW as directed from the terminal HY toward the terminal HX flows through the magnetic head connected to the terminals HX and HY. In such a stationary state that the writing current −IW flows, the absolute value of a difference in potential between the terminals HX and HY is set to be as relatively small as a voltage drop IW·RH determined by the writing current IW and the resistive component RH of the magnetic head.

In response to a change in the writing data, the differential transistor Q6 is turned ON and the differential transistor Q7 is turned OFF, whereby a current is supplied from the transistor Q1 in place of the transistor Q2. At this time, since current switching differential transistor Q3 is turned OFF and the differential transistor Q4 is turned ON, a writing current +IW flows in the direction opposed to the above case, i.e., from the terminal HX to the terminal HY.

In a transition state wherein the direction of the writing current IW is switched, the transistor Q1 causes the potential at the terminal HX to be (=V−VBEQ1) (VBEQ1 being a voltage between the base and emitter of the transistor Q1). In response to the switching operation of the current direction as above, a fly-back voltage based on a counter-electromotive force is developed in the magnetic head and acts to lower the potential at the terminal HY. However, the potential of the terminal HY is clamped by a drop in the base voltage of the output transistor Q2 receiving the collector potential of the differential transistor Q6 in the ON state. The operating current IA+IW' of the differential transistors Q6 and Q7 is dependent on the writing current IW. Since the collector potential of the transistor Q6 is determined by the above (IA+IW') times R1, the writing-current dependency can be provided to the clamp voltage of the write drive. That is, the signal amplitude of the collector of the transistor Q6 or Q7 during the transition of writing current IT of the write driver is varied to increase in response to an increase in the writing current IW, which results in that, as $\Delta i$ is increased, the clamp voltage V is correspondingly increased in accordance with the aforementioned equation (1) and thus acts to make $\Delta t$ constant.

Figure 6:
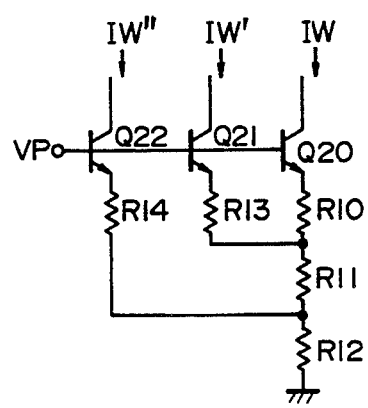
FIG. 6 is an operating current source circuit in another embodiment of the present invention.

Referring to FIG. 6, there is shown a circuit diagram of another example of the operating-current source circuit in another embodiment of the present invention. The present embodiment corresponds to the case where the currents IW' and IW'' separated respectively from the currents IA and IB are not proportional to the writing current IW, that is, are completely independent thereof.

In the circuit of FIG. 6, a constant-current transistor Q20 receives the constant voltage VP for adjustment of the writing current and draws the writing current IW. Connected to the emitter of the transistor Q20 is a series circuit of resistors R10, R11 and R12. A junction point between the resistors R10 and R11 is connected to an emitter resistor R13 which in turn is connected to the emitter of a current-source transistor Q21. The transistor Q21 receives the voltage VP and draws the current IW' (added by the current IA). A junction point between the resistors R11 and R12 is connected to an emitter resistor R14 which in turn is connected to the emitter of a current-source transistor Q22. The transistor Q22 receives the voltage VP and draws the current IW'' (added by the current IB). With such a configuration, increases in the currents IW' and IW'' in response to an increase in the writing current IW can be made small according to the resistive values of these resistors.

Figure 7:
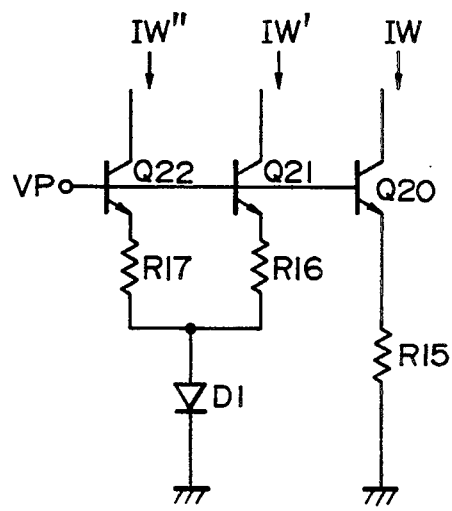
FIG. 7 is an operating current source circuit in another embodiment of the present invention.

There is shown in FIG. 7 a circuit diagram of another example of the operating-current source circuit in an embodiment of the present invention. In this case, the currents IW' and IW'' separated respectively from the currents IA and IB start to flow when the writing current exceeds a certain value and act to increase the clamp voltage, whereby the rise and fall times $t_r$ and $t_f$ of the writing current can be made fast. More specifically, the current-source transistors Q21 and Q22 receive the voltage VP and draw the currents IW' and IW'' respectively, as mentioned above. Connected to the emitters of the current-source transistors Q21 and Q22 are emitter resistors R16 and R17 respectively, and a diode D1 for level shift is commonly connected to the other ends of the emitter resistors R16 and R17. With such an arrangement, when the voltage VP is higher than a voltage (VF+VBE) corresponding to an addition of the forward voltage VP of the diode D1 and the base-to-emitter voltage VBE between the base and emitter of the transistors Q21 and Q22, the currents IW' and IW'' start to flow to increase the absolute value of the clamp voltage, whereby the rise and fall times $t_r$ and $t_f$ of the writing current can be made fast.

Figure 8:
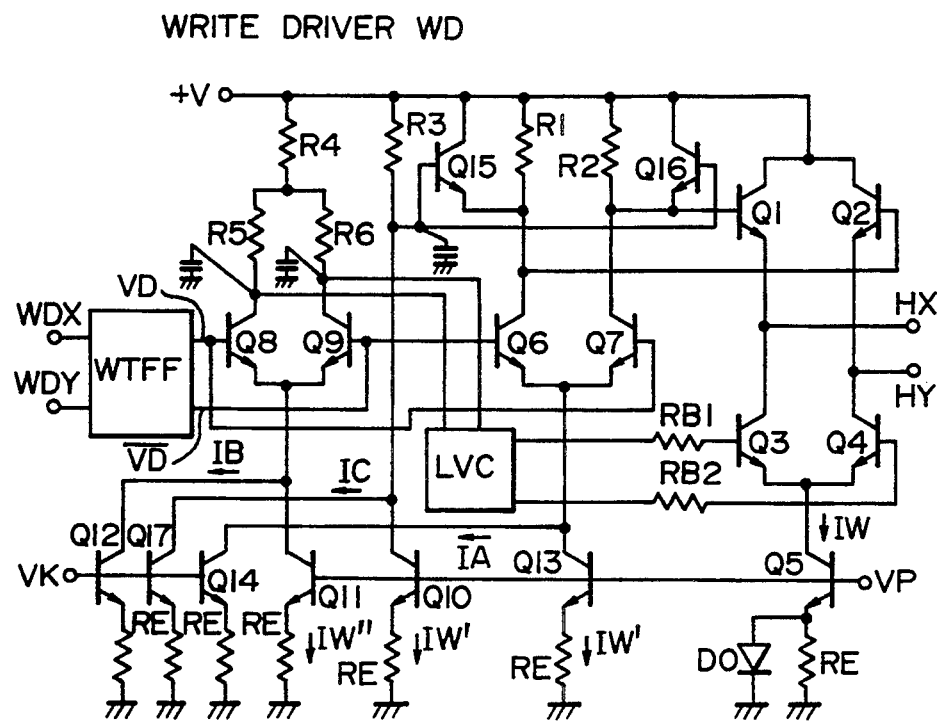
FIG. 8 is a circuit diagram of another example of the write driver WD in the present invention.

Shown in FIG. 8 is a detailed circuit diagram of another example of the write driver WD. In this example, in the case of the magnetic head connected to the terminals HX and HY, the illustrated circuit is configured in the following manner for the purpose of providing a writing current dependency to the clamp voltage for suppressing the fly-back voltage based on the counter-electromotive force developed in the magnetic head at the time of the change-over of the current direction and for the purpose of making the rise time $t_r$ of the writing current equal to the fall time $t_f$ thereof. That is, when the clamp voltage is set based on the currents flowing through the resistors R1 and R2 as in the foregoing example, there occurs a difference between the clamp voltage when the writing current rises and the clamp voltage when the writing current falls in response to variations in the resistive values of the resistors R1 and R2 through which the current IW' flows. Accordingly, this causes a difference between the rise and fall times $t_r$ and $t_f$, thus causing a duty shift between the +IW flow duration and −IW flow duration. Since the current change-over period is shortened as the writing operation is made faster, the aforementioned duty shift cannot be ignored.

In the present example, the current IW' dependent on the fixed current IC and the writing current IW is passed through a resistor R3 to provide a dependency on the writing current IW with respect to a voltage across the resistor R3. The transistor Q10 receives the voltage VP to draw the current IW''''. A transistor Q17 receives the voltage VK to draw the fixed current IC. One of the potentials at the ends of the resistor R3 is transmitted through an emitter follower transistor Q15 to the collector of the differential transistor Q6, while the other potential is transmitted through an emitter follower transistor Q16 to the collector of the differential transistor Q7. With such an arrangement, when the fly-back voltage developed during the change-over of the current causes the potentials of the terminals HX and HY to be decreased down to a level lower than the base-to-emitter voltage of the transistor Q15 and Q16, these transistors Q15 and Q16 act to supply a current and perform its clamp voltage operation. The above clamp voltages, which correspond to the common potentials of the resistor R3 transmitted to the terminals HX and HY through the emitter follower transistors Q15 and Q16, can be set to be substantially equal to each other. That is, since variations in the base and emitter voltages of the transistors Q15 and Q16 caused by the process difference are very small if present, this will not affect substantially the rise and fall times $t_r$ and $t_f$ of the writing current IW.

Figure 9:
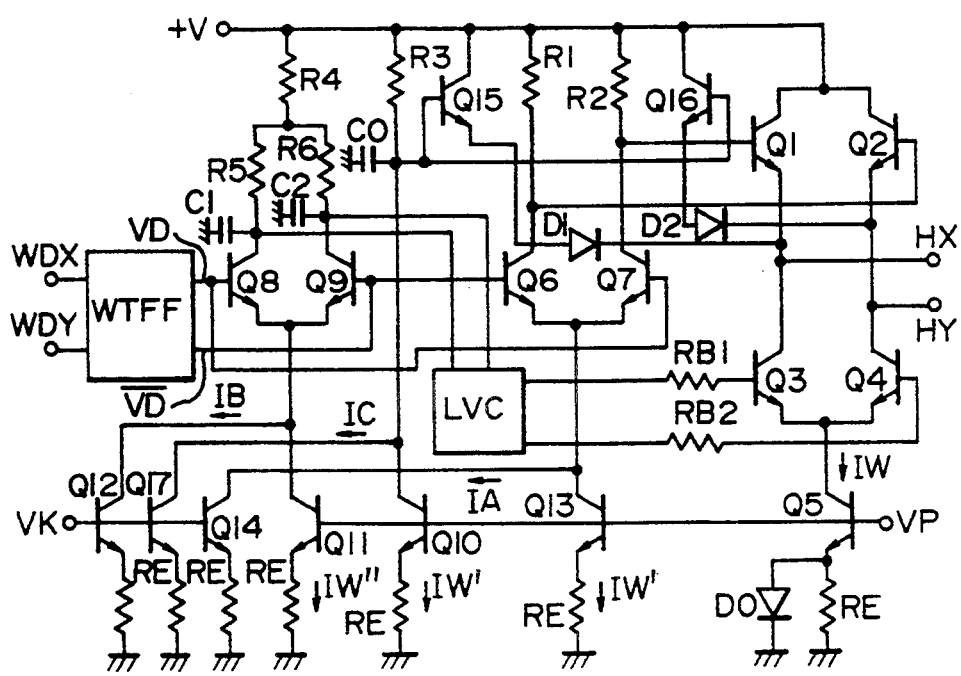
FIG. 9 is a circuit diagram of another example of the write driver WD in the present invention.

FIG. 9 shows a detailed circuit diagram of yet another example of the write driver WD. In the present example, the emitter follower transistors Q15 and Q16 receive a voltage across the resistor R3 as in the foregoing example, but emitter outputs of the transistors Q15 and Q16 are supplied directly to the terminals HX and HY to provide the voltage clamp operation. With such an arrangement, not only the voltage clamping transistors Q15 and Q16 but also the output transistors Q1 and Q2 are connected to the terminals HX and HY. When the magnetic head connected to the terminals HX and HY performs its recording and reproducing operation, the inputs of the read pre-amplifier RA are connected to the terminals HX and HY as shown in FIG. 1. The read pre-amplifier RA has desirably a small input capacitance to attain a high-speed reading operation as will be described later. This is because the noise spectrum of the read pre-amplifier RA is expressed by $f_0 = \frac{1}{2}\pi(LH \cdot CIN)^{\frac{1}{2}}$ and when the input capacitance CIN of the pre-amplifier is large, a noise peak appears in a lower frequency zone of the spectrum. In other words, in order to attain a reading signal having relatively high frequencies, the frequency $f_0$ at which the above noise becomes a peak must be higher than the frequencies of the reading signal.

When the clamping emitter follower transistors Q15 and Q16 are connected directly to the terminals HX and HY as mentioned above, these transistors Q15 and Q16 act to increase the input capacitance CIN of the read pre-amplifier RA. For the purpose of avoiding such an increase in the input capacitance CIN of the read pre-amplifier RA, in the present example, the emitters of the emitter follower transistors Q15 and Q16 are connected to the terminals HX and HY through the diodes D1 and D2 connected respectively in series therewith.

With such an arrangement, since the capacitance component of the diode D1 is connected in series with the emitter capacitance component of the transistor Q15 as the voltage clamp circuit is viewed from the terminal HX, the combined capacitance value thereof can be remarkably reduced. Similarly, since the capacitance component of the diode D2 is connected in series with the emitter capacitance component of the transistor Q16 as the voltage clamp circuit is viewed from the terminal HY, the combined capacitance value thereof can be remarkably reduced. As a result, the rise time $t_r$ of the writing current IW can be made substantially equal to the fall time $t_f$ thereof without sacrificing the read characteristics of the read pre-amplifier RA.

In the present example, a differential circuit for generating a control signal for the differential transistors Q3 and Q4 for change-over of the writing current IW includes capacitors C1 and C2 for timing adjustment. Since the capacitors C1 and C2 are provided to the transistors Q8 and Q9, the writing data from the frequency divider WTFF is subjected to the timing adjustment of the actual current change-over. These capacitors C1 and C2 may be similarly provided in the examples of FIGS. 4 and 8.

A capacitor C0 is also connected to the bases of the emitter follower transistors Q15 and Q16 for the voltage clamping operation of the terminals HX and HY. When the transistor Q15 or Q16 performs its voltage clamping operation, the corresponding base current flows through the corresponding transistor to cause potential variation of the clamp set voltage. To accommodate the influence, the capacitor C0 is inserted. Hence, even in the example of FIG. 8, it is desirable to provide the similar capacitor C0.

A diode D0 is connected in parallel to the emitter resistor RE of the transistor Q5 for generation of the writing current IW of the write driver WD. The diode D0 is provided, when the writing current IW becomes undesirably large, to automatically sense it and prevent the value of the writing current IW from exceeding a constant level. In other words, even when the voltage VP becomes too high for some reason, the base-to-emitter voltage of the transistor Q5 and the forward voltage of the diode D0 cause the voltage VP to be clamped so that the writing current IW will not exceed the constant level. The above arrangement may be replaced by such an arrangement that two diodes in series can be connected between the base of the transistor Q5 and the ground potential point of the circuit. Such a current limiting function may be provided even to the current-source transistors Q12 and Q13 or the like receiving the voltage VK.

Figure 10:
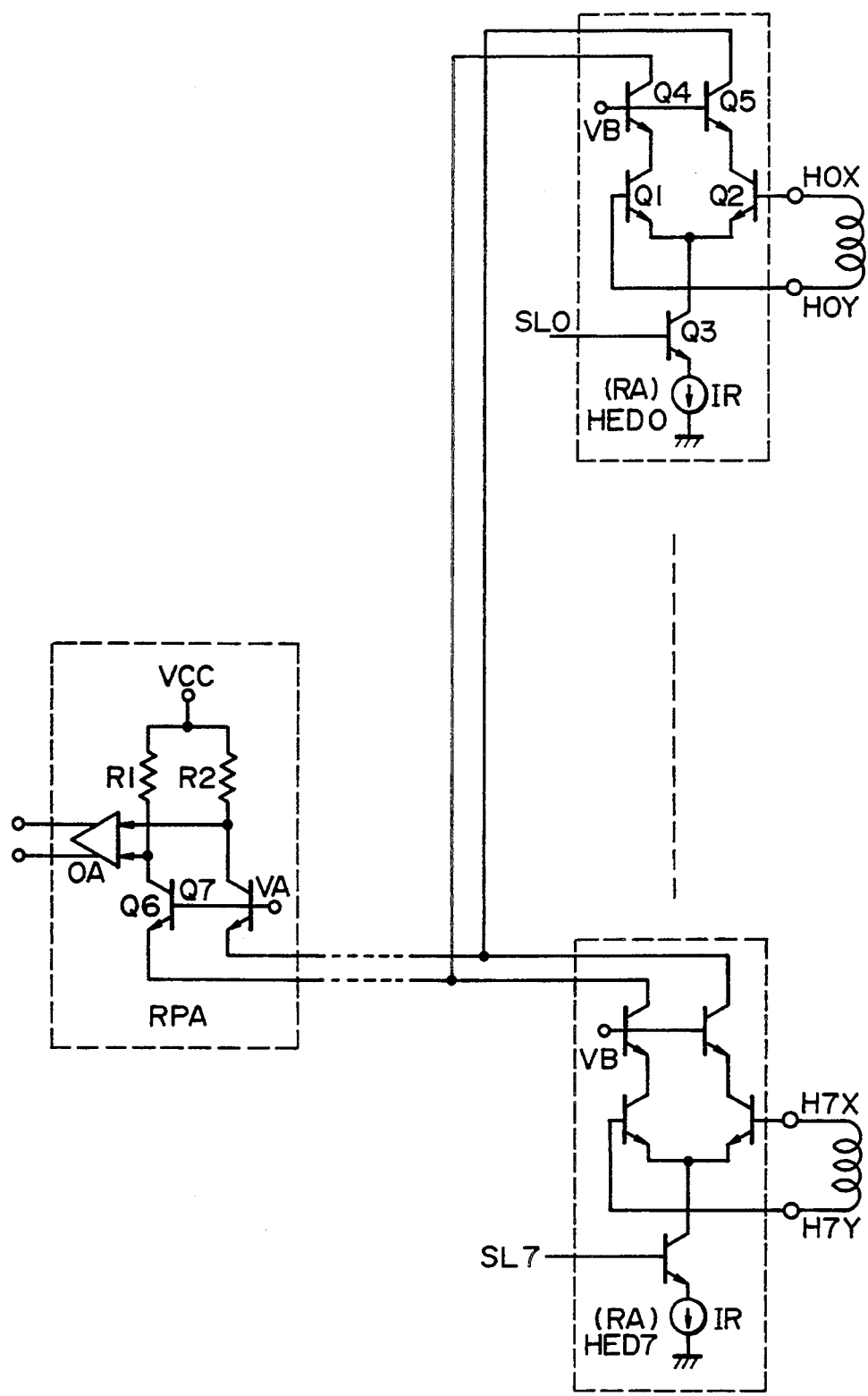
FIG. 10 is an example of an input stage circuit of read pre-amplifiers RA and a read post-amplifier RPA in the present invention.

An example of an input stage circuit of the read pre-amplifiers RA and read post-amplifier is shown in FIG. 10. In the drawing, only two HED0 and HED7 of the 8 head circuits as well as the read pre-amplifier are illustrated as represented as an example. It will be appreciated that, although the same reference symbols as in the foregoing circuits are used for the elements of the illustrated circuit for simplification of the explanation, the respective circuit elements have structures and functions different from those of the foregoing circuit elements. This explanation holds true for other drawings.

As has been already explained earlier in connection with FIG. 2, interconnection between the head circuits HED0 to HED7 and the read post-amplifier RPA is carried out by means of relatively long lines transversally wired on the chip. When the interconnection is carried out with use of such longer wiring lines, the resistance of the wiring lines is proportionally increased. When the resistive value of the wiring lines connected to the collectors of the differential amplification transistors forming the read pre-amplifier is increased, the mirror capacitance of the amplification transistor as viewed from its base side is undesirably increased. Such an increase in the mirror capacitance causes a corresponding increase in the input capacitance of the read pre-amplifier, so that the peak frequency $f_0$ of the noise spectrum is lowered as explained earlier, whereby the reading operation can be carried out only for frequencies below the peak frequency $f_0$, thus preventing a high-speed reading operation.

In the present example, the common-base amplification transistors Q4 and Q5, which receive their input signals at their emitters, are connected closely to the collectors of the differential transistors Q1 and Q2 forming the read pre-amplifier. Similar amplification transistors to the above are connected to the collectors of the differential amplification transistors of the other head circuits, and are also connected at their collectors commonly to the input terminals of the read post-amplifier RPA. The amplification transistors Q4 and Q5 are connected in each of the read pre-amplifiers, and the outputs of the read pre-amplifiers RA of the head circuits HED0 to HED7 are commonly connected to the input terminals of the read post-amplifier RPA, so that the resistance of the wiring lines leading to the input terminals of the read post-amplifier RPA provided at a location relatively spaced from the head circuits becomes very small when viewed from the differential amplification transistors Q1 and Q2, which results in that the mirror capacitance of the amplification transistors Q1 and Q2 can be remarkably reduced. In this way, since the input capacitance value of the read pre-amplifier can be made small, the noise peak frequency $f_0$ in the aforementioned noise spectrum can be made high, whereby the reading signal having frequencies belonging to the correspondingly high frequency band can be amplified.

Supplied to the bases of the amplification transistors Q4 and Q5 is a bias voltage VB. A bias current source IR provided to the emitters of the amplification transistors Q1 and Q2 is activated by a selection signal SL0 generated in the read mode. At this time, in the read pre-amplifiers of the other head circuits HED7, etc., the operating current sources IR are inactivated. Thus, the output signal of the read pre-amplifier in the active operation is transmitted to the inputs of the read post-amplifier RPA. In the present example, the common-base amplification transistors Q6 and Q7 which receive their input signals at their emitters, are used even in the first-stage circuit of the read post-amplifier RPA. That is, with this arrangement, the amplification transistors Q4, Q6 and Q5, Q7 are connected respectively in 2-stage cascade with respect to the read pre-amplifier. As a result, the high frequency reading signal can be suitably transmitted without being influenced by the resistance and capacitance of the lines wired between the head circuits HED0 to HED7 and the read post-amplifier RPA. Connected to the collectors of the amplification transistors Q6 and Q7 are the respective load resistors R1 and R2. A reading voltage established by the resistors R1 and R2 is sent through an output circuit OA to external terminals.

Also connected to the terminals H0X and H0Y of the magnetic head are a base current path of the differential amplification transistors Q1 and Q2, a damping resistor circuit for supplying the biasing voltage, etc., but these circuits are omitted in the drawing because they are not associated directly with the present invention. Such damping resistors, etc. are also similarly provided even in the other magnetic heads H1X, H1Y to H7X, H7Y.

Figure 11:
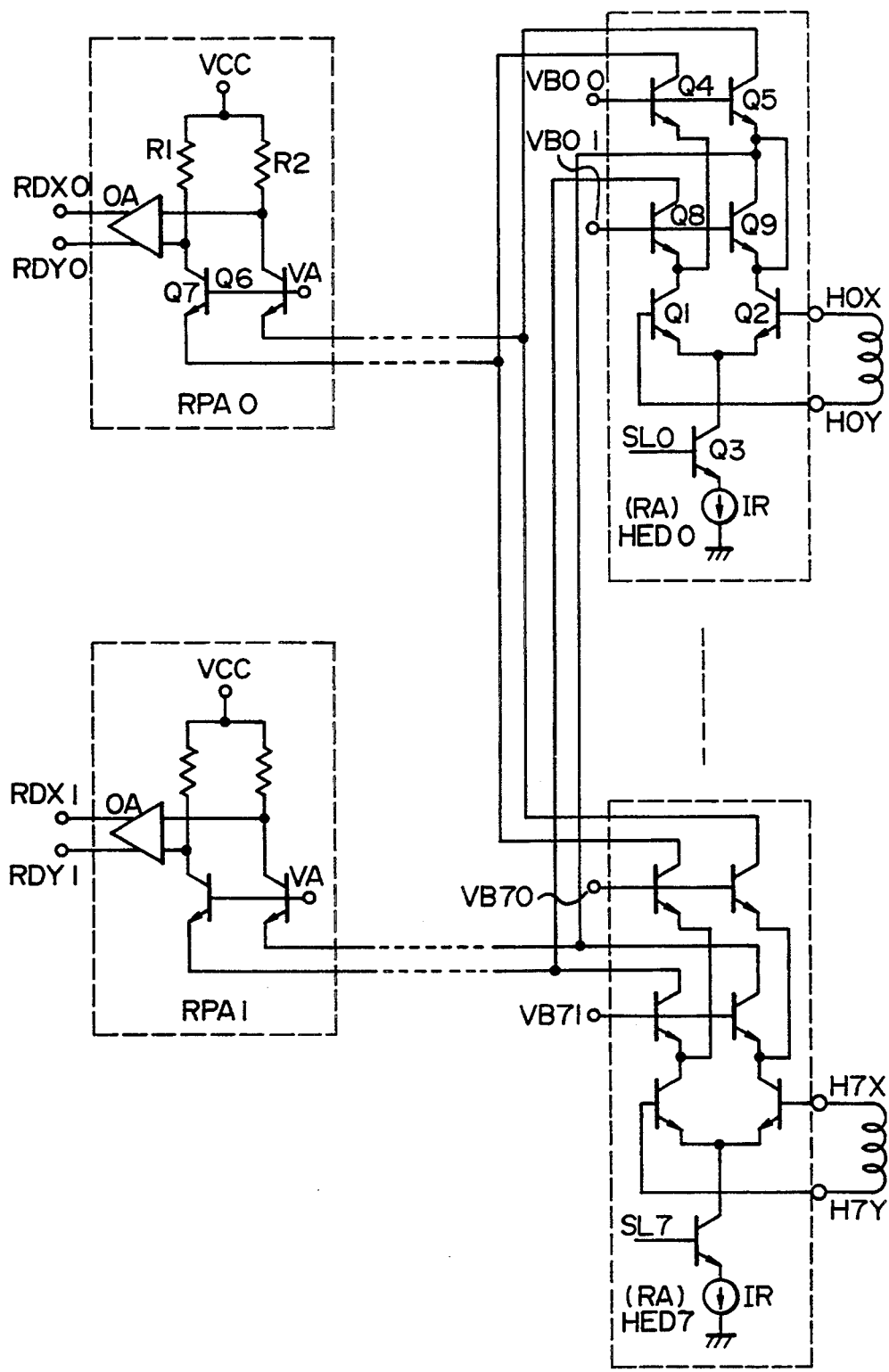
FIG. 11 is another example of the input stage circuit of read pre-amplifiers RA and read post-amplifiers in the present invention.

Another example of the input stage circuit of the read pre-amplifiers RA and read post-amplifiers is shown in FIG. 11. In the present example, two-channel reading paths are provided. To this end, read post-amplifiers RPA0 and RPA1 are provided as output circuits. For the purpose of enabling transmission of the selective reading signal between the 8 head circuits HED0 to HED7 and the 2 output circuits RPA0 and RPA1, a switching function is added to the first-stage common-base amplification transistors which receive their input signals at their emitters. More particularly, two pairs of the pre-amplifier-side or first-stage amplification transistors are provided to the collectors of the differential amplification transistors Q1 and Q2 forming the read pre-amplifier of the head circuit HED0 in association with such two-channel reading paths as mentioned above. More specifically, the amplification transistors Q4 and Q5 are connected to one of the signal paths associated with one RPA0 of the read post-amplifiers, while the amplification transistors Q8 and Q9 are connected to the other signal path associated with the other read post-amplifier RPA1.

Even in the other head circuit such as the illustrated head circuit HED7, two pairs of common-base amplification transistors which receive their input signals at their emitters and whose collectors are commonly connected to the associated reading signal paths are provided. Among the eight head circuits, two head circuits are selected so that reading signals can be output simultaneously from the two read post-amplifiers RPA0 and RPA1. For example, when it is desired to output the reading signals at the same time from the head circuits HED0 and HED7 illustrated in the drawing, head selection signals SL0 and SL7 cause the operating current sources IR of the read pre-amplifiers of the head circuits HED0 and HED7 to be activated respectively. When the reading signal of the head circuit HED0 is issued from the read post-amplifier RPA0, a biasing voltage VB00 to be supplied to the bases of the corresponding common-base amplification transistors Q4 and Q5 is set to be higher than a biasing voltage VB00 corresponding to the other read post-amplifier RPA1. As a result, the amplification transistors Q4, Q5 and Q8, Q9 are differentially operated so that the amplification transistors Q4 and Q5 put in the operational state cause the output signals of the read pre-amplifier of the head circuit HED0 to be applied to the emitters of the post-amplifier-side or second stage amplification transistors Q6 and Q7 provided in the input stage of the read post-amplifier RPA0. When the reading signal of the then-selected head circuit HED7 is issued from the other read post-amplifier RPA1, a biasing voltage VB71 to be supplied to the bases of the corresponding common-base amplification transistors is set to be higher than a biasing voltage VB70 corresponding to one read post-amplifier RPA0. As a result, the amplification transistors receiving the biasing voltages VB70 and VB71 are differentially operated so that the amplification transistors put in the operational state cause the output signals of the read pre-amplifier of the head circuit HED7 to be applied to the emitters of the second stage amplification transistors provided in the input stage of the read post-amplifier RPA1. At this time, in the other six head circuits HED1 to HED6, such biasing voltages VB10, VB11 to VB60, VB61 as mentioned above are set at a non-selection low level as in the case of the above biasing voltages VB01 and VB70. Further, since the operating current IR does not flow through the read pre-amplifiers of these circuits, the signals read out from the magnetic heads of the head circuit HED0 and HED7 are issued from the read post-amplifiers RPA0 and RPA1.

When it is desired to issue the reading signal of the head circuit HED0 from the read post-amplifier RPA1, the above biasing voltages VB00 and VB01 are inversely set. The reading signals of the other head circuits may also be issued from any one of the read post-amplifiers RPA0 and RPA1.

In the case where such two-channel reading paths as mentioned above are provided, high-speed reading operations can be equivalently established. For example, in the case where a suitable buffer memory is externally provided so that data read out at the same time are once stored in the buffer memory and a host system performs its reading operation over the buffer memory, the reading speed can be substantially doubled. Further, for the purpose of shortening the test time involved by the increased memory capacity, the simultaneous two-channel reading system may be utilized.

Of the above two-channel reading paths, one path may be used for the servo output of reproduced data. As a result, although it is necessary to provide one read/write IC for servo control in the prior art, the above one read/write IC can provide servo and reproduction outputs in the present example. In other words, when there is used a hard disk drive which has eight or fewer recording surfaces, one of which is used for servo control, a recording/reproducing circuit can be formed with a single read/write IC alone.

Figure 12:
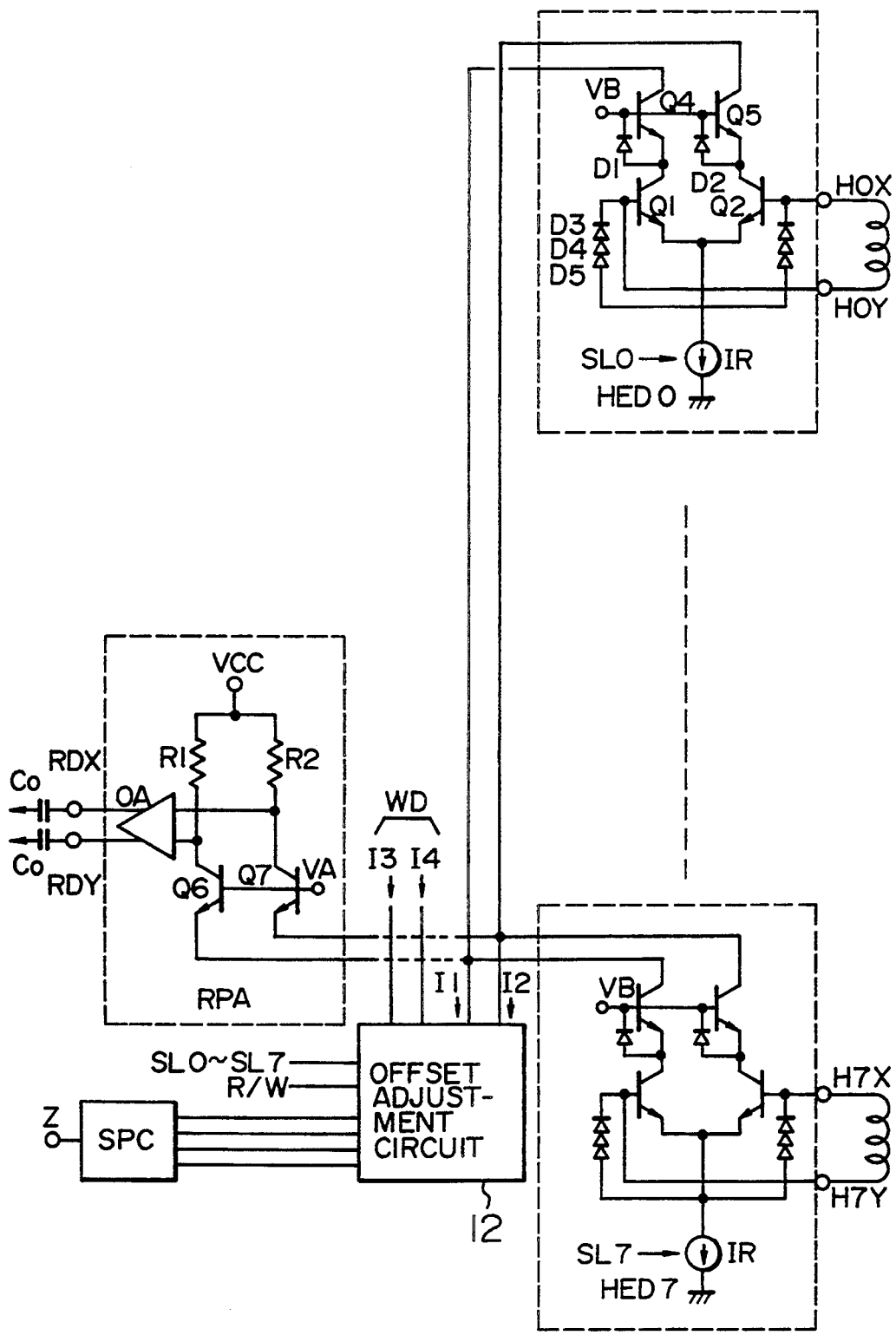
FIG. 12 is another example of the input stage circuit of read pre-amplifiers RA and a read post-amplifier in the present invention.

Shown in FIG. 12 is a circuit diagram of another example of the input stage circuit of the read pre-amplifiers RA and read post-amplifier RPA. The present example is intended to provide a high voltage-withstanding characteristic to the read pre-amplifier and to cancel the offset of the differential amplification transistors between the head circuits.

In the write operation, the operating current IR of the read pre-amplifier RA is cut off. In the write operation, a high fly-back voltage or other high voltage is instantaneously developed at the time of current change-over between the terminals H0X and H0Y and is also applied to the read pre-amplifier in its inactive state. When such a high voltage is applied between the base and emitter of the differential amplification transistors, this causes deterioration of their current amplification factors. To avoid this, in the present embodiment, protecting diodes D3 to D5 are provided between the base and emitter of the differential transistor Q1. Similarly, protecting diodes are provided in series with the base of the other differential transistor Q2.

With the above arrangement, since a voltage applied in the opposite direction is limited by the diodes D3 to D5, the deterioration of the characteristics of the transistors can be prevented. Similarly, with regard to the differential transistor Q2, a voltage applied between the base and emitter of the transistor in the opposite direction is limited by the diodes connected in series therewith.

As already mentioned above, in order to attain a reading operation of high frequencies, it is necessary to reduce the input capacitance to its limit level. Since protection diodes D3 to D5 as mentioned above are connected in series, the combined capacitance of the diodes can be reduced to $\frac{1}{3}$ of the junction capacitance of one of the diodes, which results in the above protection circuit functioning to substantially prevent the deterioration of the reading characteristics of the read pre-amplifier.

A high voltage is applied to the differential transistors Q1 and Q2 forming the read pre-amplifier RA because the current source connected to the common emitters of the differential transistors Q1 and Q2 is put in its inactive state and the transistors are put in the floating state, so that the emitter potential corresponding to the higher potential of the head terminal H0X or H0Y becomes high and thus a fly-back voltage is applied to the other differential amplification transistor. Thus, an emitter resistor may be inserted in the emitters of the differential transistors Q1 and Q2. If the connection of such a resistor in the read mode causes an inconvenience, then the resistor may be connected through a switching element only in the write mode.

The bases of the differential transistors Q1 and Q2 of the read pre-amplifier are connected to such external terminals as the terminals H0X and H0Y. A high electrostatic voltage appears on the external terminals of the semiconductor integrated circuit device during assembling processes. In order to reduce the noise of the read pre-amplifier of the differential amplification transistors Q1 and Q2, the transistors Q1 and Q2 are made relatively large in size. The size of the common-base amplification transistors Q4 and Q5 which receive their input signals at their emitters are made smaller than that of the transistors Q1 and Q2 from the viewpoint of frequency characteristic. For this reason, there is a danger that the transistors Q4 and Q5 rather than the transistors Q1 and Q2 may be electrostatically destroyed. To avoid this, in the present embodiment, protection diodes D1 and D2 are connected respectively between the base and emitter of the pre-amplifier-side or first-stage amplification transistors Q4 and Q5. As a result, the electrostatic destruction of the amplification transistors Q4 and Q5 can be prevented.

The cathode sides of the diodes may be connected not only to the biasing terminal of the bases of the transistors but also to a suitable high voltage terminal. That is, any connection of such diodes D1 and D2 can be allowed in the normal operational condition where the power source is turned ON, so long as such suitable biasing as to maintain the OFF state of the diodes D1 and D2 is provided.

When the output signals of the differential amplification circuits of the plurality of head circuits HED0 to HED7 are transmitted to one read post-amplifier RPA, the presence of an output offset voltage in the respective differential amplification circuits causes the head change-over time to be prolonged due to the charge time of the DC component-cutting capacitor Co. As is known, in a differential transistor amplifier, there occurs such an offset that, even when both transistors equally receive no input signals, variations in the characteristics of the transistors based on process variations cause the collector currents of the transistors not to be equal to each other. Such an offset takes place in each pair of differential transistors of the head circuits HED0 to HED7. For this reason, when one head is switched to another head, a difference between the offset currents appears at the load resistors R1 and R2 as an output offset voltage.

In the present example, in order to adjust the offsets of the head circuits HED0 to HED7, an offset adjustment circuit 12 is provided. The offset adjustment circuit 12, which has a memory circuit therein, detects the offsets of the head circuits HED0 to HED7 in the absence of their input signals and generates an adjustment current to cancel the offsets.

For example, when a voltage drop across the resistor R1 is large, the offset adjustment circuit generates a current I2 corresponding to the resulting difference in the current to be passed through the resistor R2. In other words, in the present example, in order to achieve fine adjustment, the difference between the currents I1 and I2 is set to correspond to the above offset current.

The value of the corresponding difference between the currents I1 and I2 is found for each of the head circuits and then stored in a suitable memory circuit. For example, a destructive program element such as a fuse may be provided within the semiconductor integrated circuit to cut it off, or a memory element such as an EPROM may be previously formed and, before being shipped, the above currents may be stored in the memory element.

Alternatively, a memory circuit such as a random access memory (RAM) or a register may be previously provided so that, when its power source is turned ON, offset adjustments are stored in the memory circuit at the time of initialization. In the latter case, in order to reduce the number of terminals, offset adjustment data made up of a plurality of bits corresponding to the respective head circuits may be serially input from one terminal, converted into parallel data through a serial-to-parallel conversion circuit SPC, and then stored in the memory circuit in association with the respective head circuits.

Head selection signals SL0 to SL7 are applied to the offset adjustment circuit. The offset adjustment circuit reads out offset adjustment data corresponding to the selected head on the basis of the head selection signals SL0 to SL7, converts the data into an analog signal, and generates the aforementioned currents I1 and I2 to be passed through the second-stage common-base amplification transistors Q6 and Q7 which receive their input signals at their emitters. At this time, a difference between the currents I1 and I2 causes the offset adjustment, thus also enabling the fine adjustment of the offset. This is because it is difficult from the circuit viewpoint to directly generate an accurate offset current.

In the present example, such a built-in offset adjustment circuit is utilized to adjust the offset current of the write circuit or the writing current. With the write driver mentioned above, the writing current is set by the current-source transistor and its emitter resistor. Since even the current-source transistor and its emitter resistor vary from head circuit to head circuit due to process variations, different writing currents are provided to different heads. Conversely, different optimum writing currents may sometimes be provided to different heads.

For the purpose of attaining an identical target writing current for the heads, the offset adjustment circuit finds adjustment currents with respect to the respective write drivers of the head circuits, stores the currents in a ROM or a RAM, reads out the selected currents therefrom on the basis of the head selection signals SL0 to SL7, converts the selected signal into analog signals, and then supplies the analog signals to the emitters of the current change-over differential transistors. As a result, adjustment of the writing currents between the heads can be attained. Further, the optimum writing currents at the inner and outer peripheries of a magnetic disk are usually different. To avoid this, track position information indicative of inner or outer periphery is input to adjust the writing currents, thus providing the respective optimum writing current values.

Figure 13:
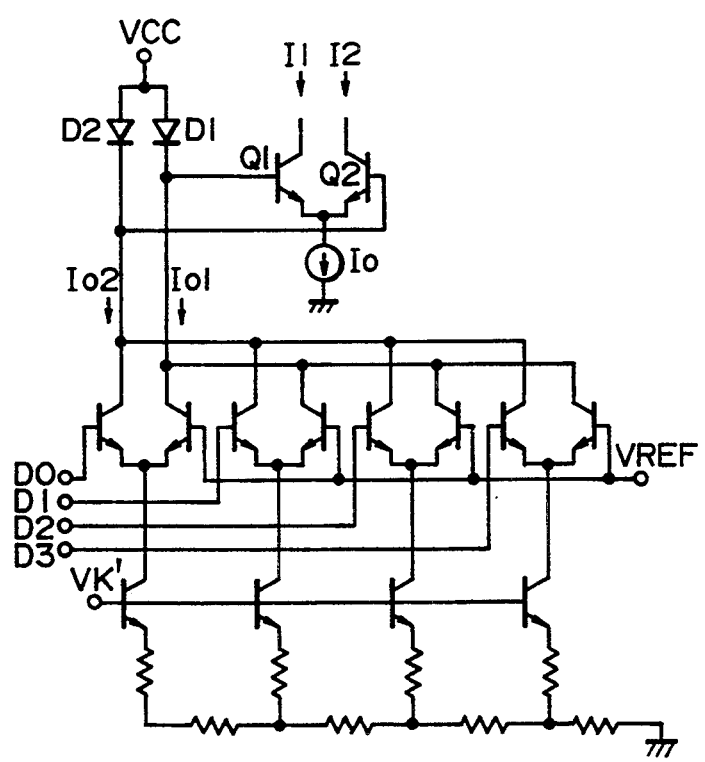
FIG. 13 is a circuit diagram of an example of a digital-to-analog conversion circuit used in an offset adjustment circuit of the read pre-amplifier in the present invention.

FIG. 13 shows a circuit diagram of an example of the digital-to-analog conversion circuit used in the above offset adjustment circuit. In the illustrated example, a known R/2R circuit and a known Gilbert circuit are used.

More specifically, an R/2R ladder circuit is provided to the emitters of a string of constant-current transistors which receive a constant voltage VK', to cause the transistors to generate constant currents having binary weights. These constant currents are sent to differential transistors which receive a reference voltage VREF and change-over digital signals D0 to D3, whereby the differential transistors draw adjustment currents Io1 and Io2 having a current ratio corresponding to the digital signals. The adjustment currents Io1 and Io2 are passed through the diodes D1 and D2 to control the transistors Q1 and Q2, whereby a reference current Io is distributed according to the aforementioned adjustment current ratio to obtain the offset adjustment currents I1 and I2. The offset adjustment currents may be generated on another digital-to-analog conversion basis.

Shown in FIG. 14 is a circuit diagram of another example of the write system circuit in the present invention. In the present example, two channel write paths are provided. Write data are input to data terminals WDX0 and WDY0 and data terminals WDX1 and WDY1. Provided to the data terminals WDX0 and WDY0 and data terminals WDX1 and WDY1 are frequency dividers WTFF0 and WTFF1 respectively. Output signal paths of the frequency dividers WTFF0 and WTFF1 are commonly connected to the input terminals of the eight head circuits HED0 to HED7.

In the drawing, only the detailed circuits of the input selection circuit associated with the head circuit HED0 are illustrated as a representative example. That is, in order for the head circuit HED0 to accept the write data of either of the frequency dividers WTFF0 and WTFF1, two sets of input selection circuits are provided in each head circuit as associated with the respective channel signal lines. More particularly, a differential amplification circuit, which comprises differential transistors Q1, Q2, collector resistors R1, R2 and an emitter current source, receives the write data from the frequency divider WTFF0, whereas a differential amplification circuit comprising differential transistors Q3, Q4, collector resistors R3, R4 and an emitter current source receives the write data from the frequency divider WTFF1. Operating voltages for these differential amplification circuits are supplied from emitter follower transistors Q5 and Q6 which receive selection voltages VS0 and VS1, respectively. Further, although not specifically limited, level shift diodes D1, D2 and D3, D4 are connected to the respective collectors of the differential amplification transistors Q1, Q2 and Q3, Q4.

Since the differential amplification circuits have common emitters, emitter follower transistors Q8, Q9 and Q10, Q11 in a wired-OR form are provided. The collector outputs of the differential transistors Q1 and Q3 of one of the two differential amplification circuits are applied to the bases of the emitter follower transistors Q8 and Q9. The collector outputs of the differential transistors Q2 and Q4 of the other differential amplification circuit are respectively applied to the anodes of the diodes D2 and D4. A level difference between the collector outputs of the differential transistors Q1, Q2 and Q3, Q4 is set to correspond to the diode forward voltage.

The common emitter outputs of the emitter follower transistors Q8, Q9 and Q10, Q11 are supplied to the input terminals $V_D$ of the next-stage write driver WD shown in FIG. 4. When the head circuit HED0 receives the write data from the frequency divider WTFF0 and transmits it to the write driver, a control voltage VS0 is set to be relatively high and a control voltage VS1 is set to be relatively low. Such a difference between the operating voltages causes a level difference between the output signals of the two differential amplification circuits to be of a DC type. This level difference causes the emitter follower transistors Q8 and Q10 to be turned ON while causing the emitter follower transistors Q9 and Q11 to be turned OFF. As a result, the write driver WD of the head circuit HED0 receives the write data from the frequency divider WTFF0 and performs its writing operation.

When the head circuit HED0 receives the write data from the frequency divider WTFF1 and transmits it to the write driver, a control voltage VS1 is set to be relatively high and a control voltage VS0 is set to be relatively low. Such a difference between the operating voltages causes a level difference between the output signals of the two differential amplification circuits to be of a DC type. Thus, as opposed to the above, this level difference causes the emitter follower transistors Q9 and Q11 to be turned ON while causing the emitter follower transistors Q8 and Q10 to be turned OFF. As a result, the write driver WD of the head circuit HED0 receives the write data from the frequency divider WTFF1 and performs its writing operation.

When the head circuit HED0 receives the write data from the frequency divider WTFF0, a selected one of the other seven head circuits HED1 to HED7 can accept the write data from the frequency divider WTFF1. For example, when the head circuit HED1 receives the data from the frequency divider WTFF1, the control voltage VS1 is set to be relatively high, while the control voltage VS0 is to be relatively low. When the two head circuits perform writing operations at the same time, the operating current sources of the differential amplification circuits of the remaining six head circuits are put in the inactive state by the head selection signals.

Such simultaneous writing operations by the two heads are valid, e.g., for shortening the test time. Since writing operations can be carried out over two recording surfaces of the hard disk drive at the same time in the write test mode, the write time can be reduced to half. If the two-head simultaneous read circuit is used as shown in FIG. 11, the write/read test time can be reduced to half. Since memory capacity tends to become increasingly large and correspondingly the test time tends to be long, the simultaneous two-channel writing and reading function is highly effective.

Of the two write channels, one may be used for writing servo data. In other words, since the writing of servo data is carried out only once at the time of initializing the hard disk drive, the need for mounting a single read/write integrated circuit in the prior art can be eliminated. For example, in the case where a hard disk drive has eight recording surfaces including a servo surface, when the two-channel write and read circuits are provided as in the present embodiment, all of the read and write circuits can be integrated in the form of a single read/write integrated circuit.

Figure 15:
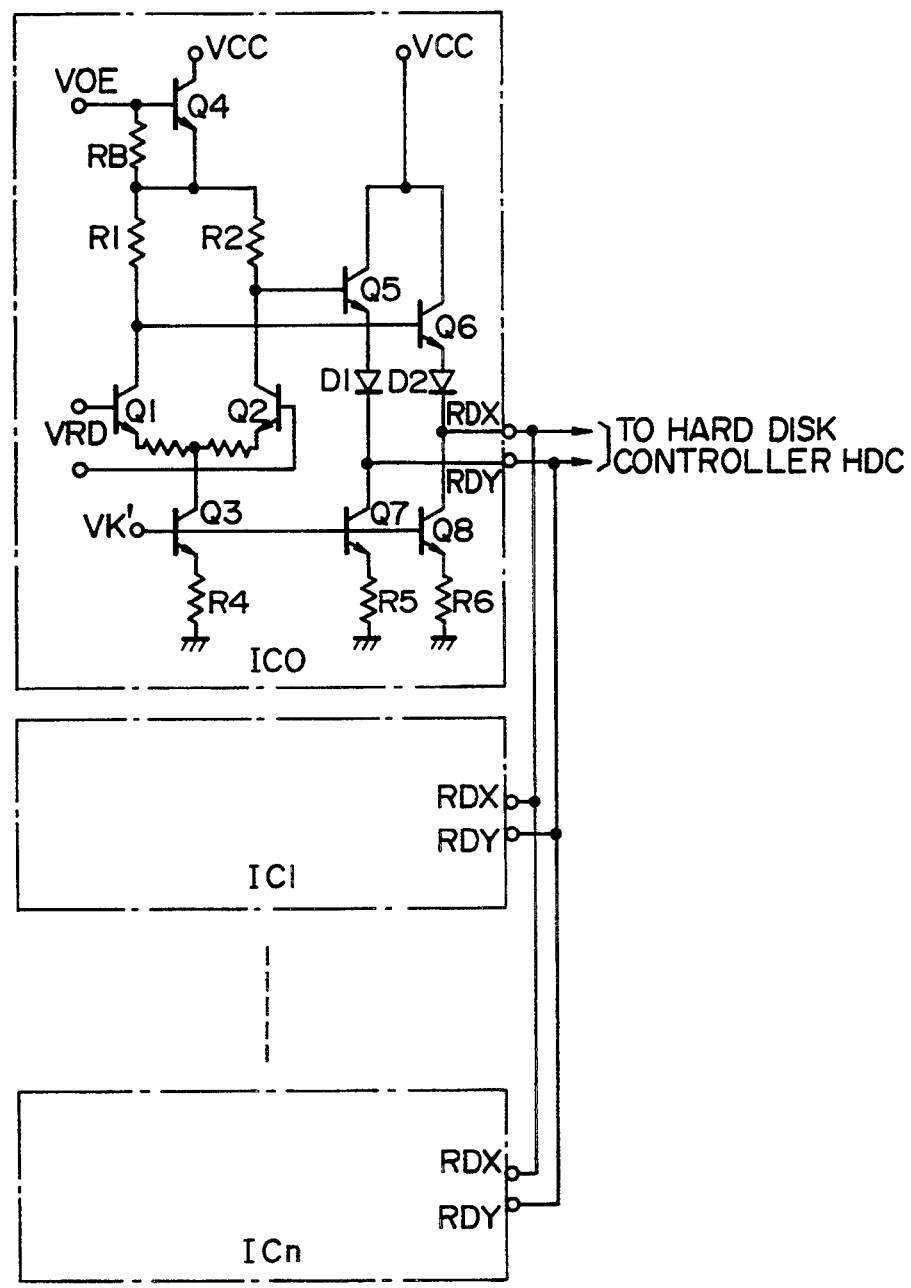
FIG. 15 is a circuit diagram of an example of an output circuit of the read post-amplifier RPA in the magnetic head of the invention.

Referring to FIG. 15, there is shown a circuit diagram of an example of the output circuit OA of the read post-amplifier RPA in the magnetic head circuit of the present invention.

A read signal VRD is applied to the bases of the differential transistors Q1 and Q2. Although not specifically limited, the signal VRD is obtained from the common-base amplification transistors which are connected in two-stage cascade and which receive their input signals at their emitters as shown in FIG. 10. An emitter resistor is connected to each of the emitters of the differential transistors Q1 and Q2 and receives a respective operating current from a current source circuit of a transistor Q3 and an emitter resistor R4. Load resistors R1 and R2 are connected to the respective collectors of the differential transistors Q1 and Q2. The load resistors R1 and R2 are connected at their power source ends with an emitter follower transistor Q4 which receives a control voltage VOE.

Wired between the base and emitter of the transistor Q4 is a resistor RB. Collector output signals of the differential transistors Q1 and Q2 are sent to the bases of emitter follower output transistors Q5 and Q6 respectively. Provided to the emitters of the output transistors Q5 and Q6 are diodes D1 and D2 respectively. Connected in series with these diodes D1 and D2 are transistors Q7 and Q8 and emitter resistors R5 and R6 which form the constant current load of the emitter follower output circuit. The level shift diodes D1 and D2 are connected at their cathode ends to output terminals RDX and RDY.

When the read/write integrated circuit having such an output circuit is mounted in plural numbers (such as IC0 to ICn) to form a magnetic memory unit, the corresponding output terminals RDX and RDY of the read/write integrated circuits IC0 to ICn are commonly connected, respectively. In other words, in the present embodiment, the need for providing an analog switch circuit in the prior art to extract the read data from a selected one of the plurality of read/write integrated circuits can be eliminated.

With such an output circuit as mentioned above, when the read data are extracted from a selected one of the plurality of read/write integrated circuits IC0 to ICn, for example from the integrated circuit ICo, the control voltage VOE is set to be relatively high. That is, the chip select signal received from the terminal CS causes the control voltage VOE to be set relatively high. At this time, in each of the other read/write integrated circuits IC1 to ICn not selected, the control voltage VOE is set relatively low because the respective chip select signals are put in the non-selection state. In the nonselected read/write integrated circuits IC1 to ICn, the voltage VK' for generation of the operating current is also set relatively low. As a result, the operating currents of the differential amplification transistors and emitter follower output circuit are also limited to low level. In the nonselected read/write integrated circuits, since the base potential of the emitter follower output transistors can be stably set at low level in response to the control voltage VOE so that the operating current of the emitter follower circuit is very small, seven of the very small currents are not influenced by the operation of the emitter follower output circuit.

As mentioned above, in the plurality of read/write integrated circuits IC0 to ICn, the output terminals RDX and RDY are commonly connected, but the DC base potentials of the transistors Q5 and Q6 in the selected read/write integrated circuit IC0 are high and the DC base potentials of the nonselected circuits are low. As a result, the emitter follower output transistors of the nonselected read/write integrated circuits IC1 to ICn are in the OFF state so that the read signal from the emitter follower output transistors Q5 and Q6 of the read/write integrated circuit IC0 then being in the ON state is transmitted to a hard disk control circuit HDC.

In the read/write integrated circuits in the nonselected mode, the voltage VK' may be set at a low level, such as the circuit ground, to completely turn OFF the current-source transistors Q3, Q7 and Q8. With such an arrangement, the output terminals RDX and RDY of the nonselected read/write integrated circuits can be set to have high output impedances. At this time, since the transistor Q5 and diode D1 as well as the transistor Q6 and diode D2 are connected respectively in series, a parasitic capacitance between the base and emitter of the transistor can be reduced to half and frequency characteristics and voltage withstanding margin can be improved.

Figure 16:
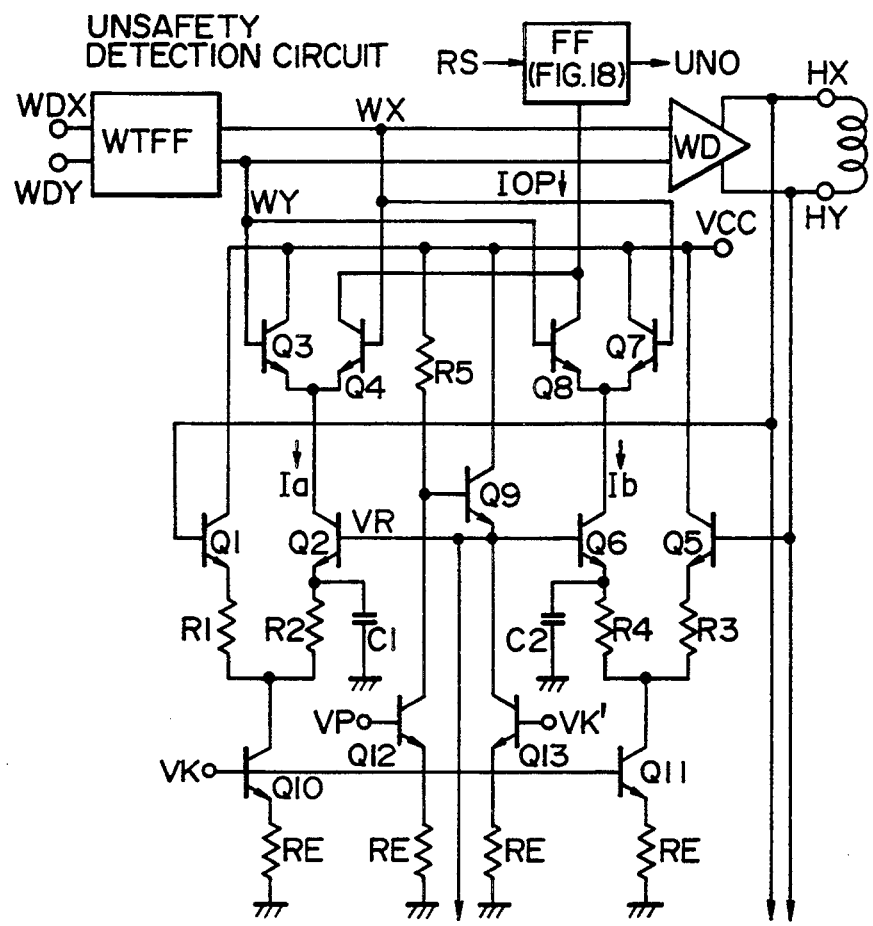
FIG. 16 is a circuit diagram of an example of a broken-line detection circuit contained in an unsafety detection circuit USF of the magnetic head circuit of the present invention.

Turning to FIG. 16, there is shown a circuit diagram of an example of a broken-line detection circuit for detecting a broken line (open-circuit) in the magnetic heads, the detection circuit being included in the unsafety detection circuit USF of the magnetic head circuit of the present invention. Here, the unsafety detection circuit USF is provided to detect a short-circuit or a broken line in the magnetic heads.

Figure 17:
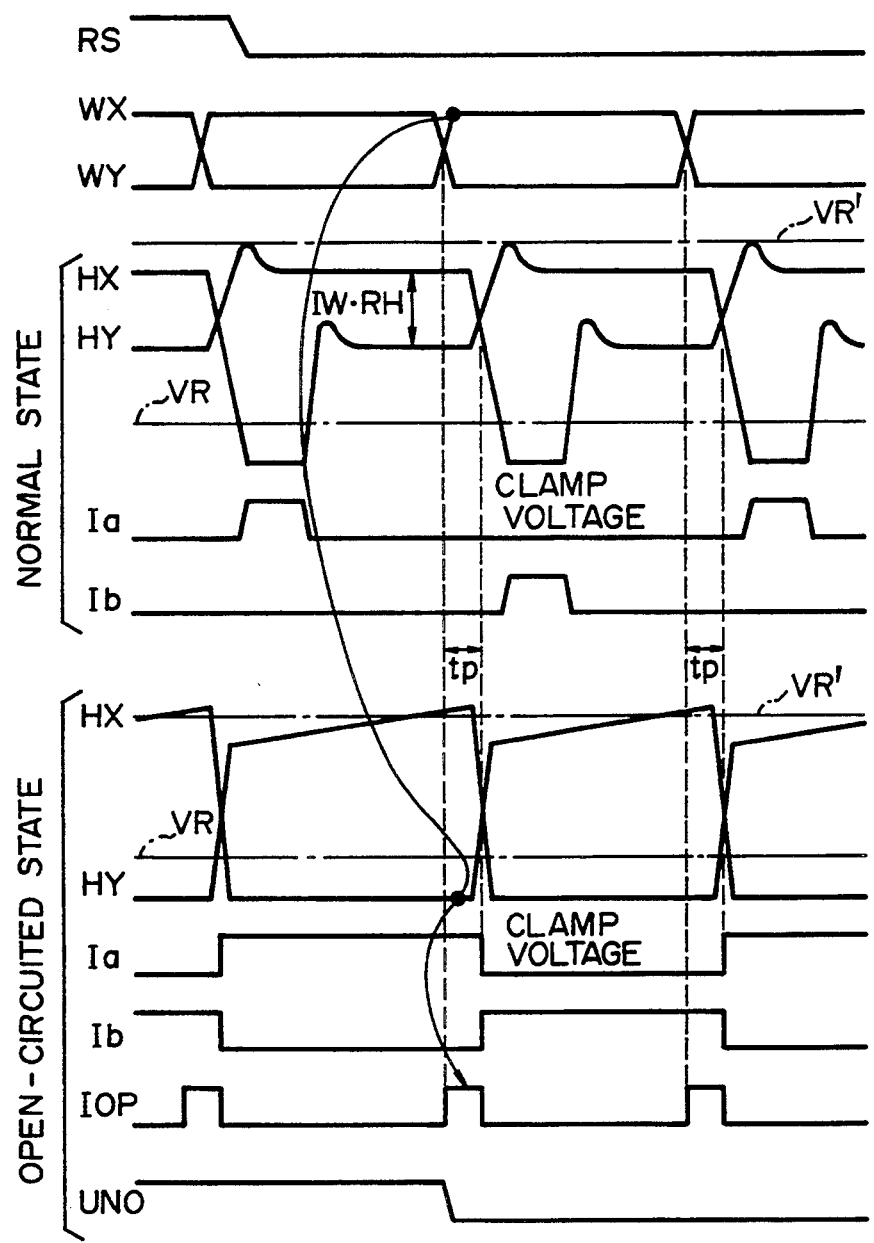
FIG. 17 shows waveforms of signals for explaining an exemplary operation of the broken-line detection circuit of the present invention.

FIG. 17 shows waveforms of signals for explaining an example of the operation of the broken-line detection circuit according to the present invention, together with a prior art broken-line detection method. When a broken line takes place in the magnetic head, the higher potential of the terminals HX and HY is raised to the operating voltage by a damping resistor (not shown). In the prior art, this fact is utilized to distinguish the normal state from the broken-line state by a difference between the high potentials of the normal and broken-line states arrived at a reference voltage VR'.

More particularly, in normal operation, an overshoot at the time of current change-over causes the terminal potential to be temporarily increased nearly to the reference voltage but to eventually settle at the output voltage of the write driver. Meanwhile, in the broken-line state, the above time constant causes the terminal potential to be raised up to the operating voltage exceeding the reference voltage VR'.

In such a broken-line detection method, when the data frequency is increased with the increased operation, the time constant determined by the damping resistor and parasitic capacitance causes change-over of the write data before the higher terminal potential reaches the reference voltage VR', thus resulting in a failure to detect the broken line in the magnetic head. That is, the calculation of the inventor of the present application has shown that the prior art broken-line detection method cannot detect the broken line at a data frequency of about 8 MHz or so. Thus, as the writing operation is made faster, a development of a broken-line detection circuit having a sufficient margin is demanded.

The inventor of the present application has found that, for the purpose of detecting a broken line with high accuracy independently of the frequency of input data, the delay of the write driver can be utilized to distinguish the broken-line state from the normal state. To illustrate, in FIG. 17, in a duration corresponding to a delay between the input data WX, WY and the write driver, that is, in a duration corresponding to a delay time tp in the terminal HX and HY waveforms, the lower potential of the terminals HX and HY under the normal state is very different from that under the broken-line state. More specifically, in the normal state, immediately before the direction of the write current is switched, the generation duration of the fly-back voltage is terminated so that the lower terminal potential is set to be a relatively high potential as IW·RH, with the higher terminal potential as a reference. Meanwhile, in the broken-line state, the lower terminal potential remains at the clamp voltage. Thus, when the reference voltage VR is set at an intermediate level between the above two sorts of voltages, a distinction can be realized between the normal and broken-line states.

In FIG. 16, the output signals WX and WY of the frequency divider WTFF are supplied to the bases of the differential transistors Q4 and Q3 respectively. Connected to the common emitters of the differential transistors Q3 and Q4 is the collector of the differential transistor Q2 which receives the reference voltage VR. The potential of the terminal HX is supplied to the base of the differential transistor Q1 which forms a pair with the differential transistor Q2.

In this embodiment, a capacitor C1 is provided to the emitter of the differential transistor Q2 to substantially enlarge the delay of the write driver which operates in response to the input data WX and WY and to thereby make the operating margin large. The capacitor C1, which is also connected to the emitter resistor R2, acts to delay the change-over timing of the differential transistors Q1 and Q2. In other words, the capacitor C1 equivalently delays the output signals of the write driver.

The output signals WX and WY of the frequency divider WTFF are also supplied to the bases of the differential transistors Q7 and Q8 respectively. Connected to the common emitters of the differential transistors Q7 and Q8 is the collector of the differential transistor Q6 which receives the reference voltage VR. The potential of the terminal HY is supplied to the base of the differential transistor Q5 which forms a pair with the differential transistor Q6.

In this embodiment, a capacitor C2 is provided to the emitter of the differential transistor Q6 to provide a delay between the input data WX, WY and the signal in the write driver, that is, a delay corresponding to nearly half of the delay time tp. The capacitor C2, together with the emitter resistor R4, acts to delay the change-over timing of the differential transistors Q5 and Q6 as in the capacitor C1.

Current-source transistors Q10 and Q11 for generation of the operating currents are provided to the differential transistors Q1, Q2 and Q5, Q6 respectively. Though not specifically limited, for the purpose of reducing the current consumption, the transistors Q10 and Q11 are supplied with a constant voltage VK only in the write operation to activate the operation of the broken-line detection circuit.

When a write-current dependency is applied to the lamp voltage of the fly-back voltage, the potentials of the terminals HX and HY also vary correspondingly. A current corresponding to the write current set by a transistor Q12 receiving the voltage VP is passed through a resistor R5 so that a voltage developed across the resistor R5 is supplied through an emitter follower transistor Q9 to generate the reference voltage VR. A current-source transistor Q13 receiving the voltage VK' generates its operating current.

The current-source transistors Q10 to Q13 are provided at their emitters with emitter resistors RE respectively. In the present example, this does not mean that these emitter resistors RE have identical resistance values, but merely means that these resistors RE are provided to the associated emitters.

In this connection, as in the circuit for generating the clamp voltage of the write driver, a combined current of the fixed current and write current may be passed through the resistor R5 for generation of the reference voltage Vr thereacross. The collectors of the differential transistors Q4 and Q8 are commonly connected so that a detection current IOP flows through the common collectors. Since the detection current IOP is of a pulse type which is generated in a very short time period, a latch circuit FF is provided to generate a broken-line detection signal UN0 in response to the detection current IOP.

In the two sets of differential transistor circuits connected in cascade, when the transistors Q2 and Q4 are turned ON or when the transistors Q6 and Q8 are turned ON, the detection current IOP flows, whereby a logical circuit for satisfying the following logical expression (1) is formed:

$$IOP = WX \cdot HXB + WY \cdot HYB \tag{1}$$

HXB and HYB mean to have a low active level, that is, a logic 1 when they are lower than the reference voltage VR.

In the normal state, since the flowing timing of the current Ia does not coincide with the timing of the input data WX and WY, no detection current IOP flows. In a break state, meanwhile, the detection current IOP flows for a delay time period of the output voltage HX or HY with respect to the input data WX or WY. The latch circuit FF is reset when the operation is started. Hence, after a reset signal RS is changed to low level, the latch circuit FF is reset by the first detection current IOP and then the detection signal UN0 is changed to low level. Since the aforementioned delay time tp is not influenced by the frequency of the write data, unlike the prior art, and is kept substantially constant, broken-line detection can be realized with high reliability. In particular, when the delay circuit mentioned above is provided so that the broken-line detection circuit equivalently provides a delay to the output signals of the write driver while not influencing the writing operation, i.e., while not delaying the actual operation delay of the write driver, the operational margin can be made large.

Figure 18:
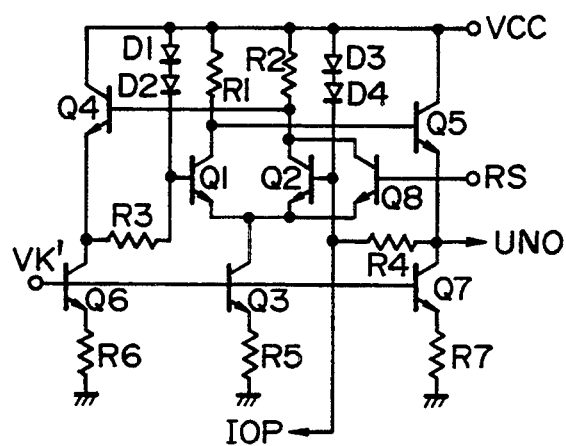
FIG. 18 is a circuit diagram of an example of a latch circuit used in the broken-line detection circuit of the present invention.

Shown in FIG. 18 is a circuit diagram of an example of the latch circuit FF. The latch circuit is arranged so that the collector outputs of the differential transistors Q1 and Q2 are fed back to the bases of the mutually opposing differential transistors Q2 and Q1 through the emitter follower transistors Q5 and Q4. The output signal UN0 is issued from the emitter of the transistor Q5.

The input differential transistor Q2 drawing the above detection current IOP through its base is connected in parallel to a resetting transistor Q8. Supplied to the base of the resetting transistor Q8 is the reset signal RS. Level setting diodes D1, D2 and D3, D4 are connected to the bases of the differential transistors Q1 and Q2 respectively so that the output signals of the emitter follower transistors Q4 and Q5 are fed back to the differential transistors Q1 and Q2.

The transistors Q3, Q6 and Q7 form constant current sources which generate the operating currents of the differential transistors Q1, Q2 and the emitter follower transistors Q4, Q5. For the purpose of lowering the power consumption, these transistors Q3, Q6 and Q7 are put in the operative state by the constant voltage VK' which is generated only in the writing operation.

When the reset signal RS is high, the latch circuit is fixed at its reset state. That is, the signal RS causes the transistor Q8 to be forcingly turned ON so that the output signal of the emitter follower output transistor Q4 becomes low, whereby the differential transistor Q1 is maintained at the OFF state. As a result, the output signal UN0 obtained from the collector of the differential transistor Q1 is at high level.

When the reset signal RS is changed to low, this causes the transistor Q8 to be turned OFF. At this time, in response to the high-level output signal UN0 of the differential transistor Q1 in the OFF state, the differential transistor Q2 is turned ON and maintains its state.

Then due to a voltage drop across the resistor R4 drawing the current IOP, the base voltage of the differential transistor Q2 is set to be lower than the base potential of the differential transistor Q1. As a result, the differential transistor Q1 is turned ON and the differential transistor Q2 is turned OFF, so that the output signal UN0 is changed to low. The latch circuit FF holds the above state in the low level duration of the reset signal RS. As mentioned above, since the current IOP flows when a broken line occurs in the head or when a short-circuit takes place between the head and ground potential GND, the output signal UN0 is changed to low to detect the abnormal condition.

FIG. 19 shows a circuit diagram of an example of a short-circuit detection circuit of the magnetic head included in the unsafety detection circuit USF of the magnetic head circuit of the present invention. As shown by operational signal waveforms in FIG. 20, a short-circuit detection method in the present example utilizes a difference between the waveforms of the fly-back voltage in the normal and short-circuited states. That is, in the normal state of the magnetic head, the fly-back voltage is generated when the direction of the write current is switched according to the write data WX and WY.

Meanwhile, in the short-circuited state of the magnetic head, its inductance component becomes remarkably small, so that, even when the fly-back voltage is generated, the voltage becomes a spike-shaped pulse having a very short pulse width. Hence, both the normal and short-circuited states can be discriminated through the voltage comparing operation with use of a reference voltage VR" that is set to be lower than the lower terminal potential determined by the voltage drop corresponding to a product of the write current IW and resistance component RH of the magnetic head. That is, in the normal state, such a fly-back voltage is generated that has a relatively long period during which the terminal voltage HX or HY is lower than the reference voltage VR".

Figure 20A:
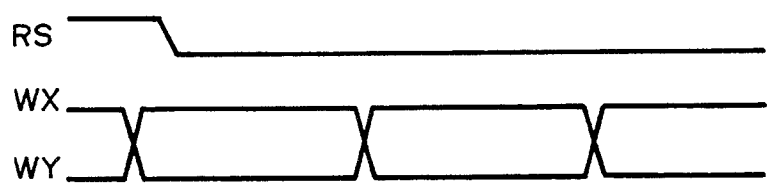
FIG. 20A to 20D show waveforms of signals for explaining an exemplary operation of the short-circuit detection circuit of the present invention, respectively.
Figure 20B:
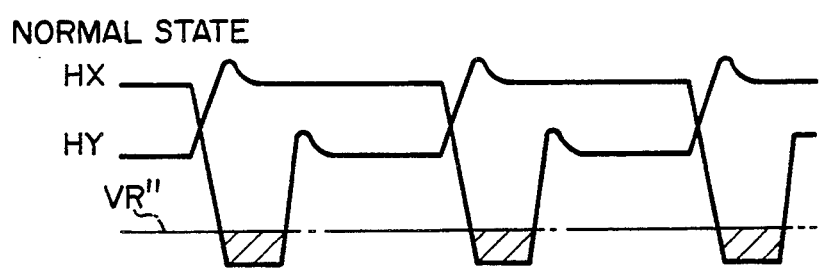
Figure 20C:
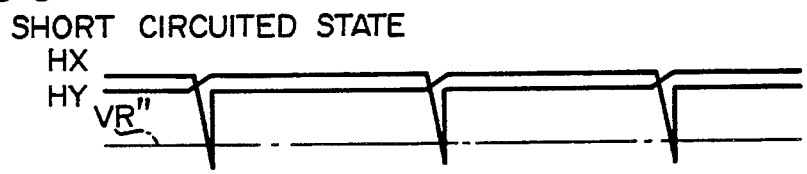
Figure 20D:
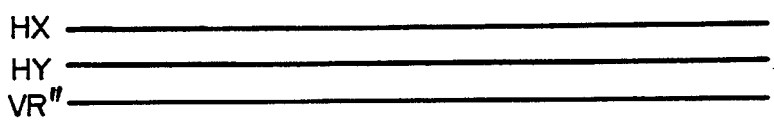

In the short-circuited state, on the other hand, such a fly-back voltage as the above is not generated so that a difference between the terminal potentials HX and HY becomes very small and thus the terminal voltage HX or HY is not substantially lower than the reference voltage VR" as shown in FIG. 20C. Further, even when write data are externally input and the frequency divider produces such a failure as fixed data (FIG. 20D) caused by a circuit failure (as when the frequency divider fails to perform its inverting operation over the input data), no fly-back voltage is generated as in the short-circuited state so that the terminal voltage HX or HY is not substantially lower than the reference voltage VR".

In FIG. 19, the reference voltage VR" is obtained by level shifting the reference voltage VR of the aforementioned broken-line detection circuit through an emitter follower transistor Q26 and the terminal potential HX through differential transistors Q20 and Q21. The constant voltage VK', transistor Q31 and emitter resistor RE form a constant-current load circuit for the emitter follower transistor Q26. Similar differential transistors Q23, Q24, constant-current transistor Q32 and emitter resistor RE form an HY-terminal fly-back voltage detection circuit. In the present example, since level shifting diodes D1 and D6 are inserted respectively in the emitters of the differential transistors Q20 and Q24 receiving the terminal potentials HX and HY, the reference voltage VR" can be set lower equivalently by the forward voltage of the diode D1 or D6.

A collector Id of the differential transistor Q23 is used as the discharge current of a capacitor C5. A transistor Q25 and a diode D4 are provided to set a low level Va and a high clamp level. The capacitor C5 and a very small constant current Ic form a timer circuit. That is, when the hold voltage of the capacitor C5 reaches a constant level, this causes a transistor Q27 forming a Schmitt trigger circuit to be turned ON so that a detection signal UN1 is set at low level. The Schmitt trigger circuit, once the differential transistor Q27 is turned ON, also sets its collector potential at low level. Thus, since the base potential of the other differential transistor Q28 is switched to a reference potential lower by an amount corresponding to the voltage between the base and emitter of an emitter follower transistor Q29, the detection signal UN1 is not inverted from low to high so long as the potential across the capacitor C5 is not lower than the reference potential.

Similarly to the above, even the differential transistors Q20 and Q21 form a circuit through which a discharge current Id' flows. The capacitor C5 (and C5') is intermittently discharged. Accordingly, in the normal state, since the discharging operation is carried out with such an intermittent current Id (and Id'), the holding voltage Va of the capacitor C5 (and C5') will not reach the base potential (VCC−VBEQ29−RZ·IZ) of the differential transistor Q28. Meanwhile, in the head short-circuited state or fixed data state mentioned above, since such discharging operation acts to cancel the charging operation of the constant current Ic, the holding voltage of the capacitor C5 (or C5') becomes high so that the output signal UN1 is changed to low level. Even in the short-circuited state between the head terminal and power source VCC, since the discharging operation is not carried out, the output signal UN1 is set at low level. The aforementioned broken-line detection signal UN0 and short-circuiting detection signal UN1 are issued as high level signals, for example, from the terminal WOK in the magnetic head circuit of FIG. 1.

Such a voltage comparison circuit receives the terminal potentials HX and HY. When it is desired to apply a dependency to the clamp voltage (fly-back voltage) with use of the write current as in the foregoing example, it is necessary to correspondingly change the reference voltage VR" of the above voltage comparison circuit to secure the operational margin. Hence, even in the case where the reference voltage VR" of the short-circuit detection circuit is used, if the reference voltage VR having the write current dependency based on the broken-line detection circuit is utilized in the level shift, the circuit can be simplified and the operational margin can be secured. The present circuit can be made with a simple arrangement and can detect both of the short-circuiting fixed data. Further, even with regard to the aforementioned short-circuiting between the head terminals and power source VCC, the present circuit can detect the abnormality.

Although the invention of the inventor of the present application has been detailed in connection with the embodiments, the present invention is not limited to the foregoing specific embodiments but may be modified in various ways within the scope of the appended claims. For example, the write data may be not of the differential type and the frequency divider may be omitted. The number of heads is not restricted to eight but may be set to an arbitrary value as necessary. Further, the magnetic head may comprise separate writing and reading heads. That is, the magnetic head connected to the write driver can be provided separately from the magnetic head connected to the read pre-amplifier. In this connection, the magnetic head circuit may comprise reading and writing integrated circuits. Furthermore, the circuits of all the foregoing embodiments may be made respectively not only in the form of one or more semiconductor integrated circuit devices but also in other forms including a combined form of one or more semiconductor integrated circuits and external elements.

The present invention can be widely applied as a magnetic head circuit.

What is claimed is:

1. A magnetic head circuit having a plurality of head circuit sets for a plurality of magnetic heads, each of said head circuit sets comprising:
   a first pair of transistors whose emitters are connected to each other for receiving data signals;
   first and second resistors each connected between a power source and a collector of a respective one of said first pair of transistors;
   a second pair of emitter follower transistors whose bases are connected to the collectors of said first pair of transistors for performing a differential operation;
   a third pair of differential transistors connected to said second pair of emitter follower transistors and whose emitters are connected to each other for performing a differential operation;
   a first current source connected to the emitters of said first pair of transistors for supplying a current to said first pair of transistors and said resistors connected to the first pair of transistors, said first current source including a first transistor having a first emitter-resistor, a first base and a first collector connected to the emitters of said first pair of transistors and having a predetermined emitter size ratio;
   a second current source connected to the emitters of said third pair of differential transistors, said second current source including a second transistor having a second emitter-resistor, a second base and a second collector connected to the emitters of said third pair of transistors and having substantially said predetermined emitter size ratio;
   a predetermined control voltage terminal connected to said first and second bases of said first and second current sources for receiving an adjustable control signal corresponding to inner/outer peripheries of a recording track; and
   a pair of signal terminals connected respectively to junction points between said second pair of emitter follower transistors and said third pair of transistors for outputting therefrom signals corresponding to said data signals,
   wherein collector voltages of said first pair of transistors are dependent on a current flowing through said first current source in response to said adjustable control signal.

2. A magnetic head circuit as set forth in claim 1, wherein said first and second current sources are transistors having a common base connected to said predetermined control voltage terminal applied with a constant adjustable voltage and each of which causes a current corresponding to currents flowing through said pair of signal terminals and said size ratio.

3. A magnetic head circuit as set forth in claim 1, further comprising another current source connected to the emitters of said first pair of transistors for providing differential operation of said first pair of transistors on the basis of said second predetermined voltage and for supplying a current to said first pair of transistors and said resistors connected to the collectors of said first pair of transistors.

4. A magnetic head circuit as set forth in claim 1, further comprising two frequency divider means for dividing the frequency of the data signals, and wherein each of said head circuit sets further comprises selection means for selecting one of outputs of said two frequency divider means according to selection signals and for providing the selected output to the bases of said first pair of transistors, and at least two of said head circuit sets receive different selection signals and at the same time provide signals corresponding to the data signals to the corresponding signal terminals.

5. A magnetic head circuit as set forth in claim 1, further comprising:
   first and second two-input differential operation means connected respectively to current sources, said first and second differential operation means each having capacitor means connected thereto for delaying differential operation;

other differential operation means connected to one input of each of said differential operation means for detecting a level difference between data signals;

wiring means connecting said pair of signal terminals to the other inputs of each of said differential operation means; and flip-flop means connected to said other differential operation means and a reset signal RS, said flip-flop means including a plurality of transistors.

6. A magnetic head circuit as set forth in claim 1, further comprising:

first and second two-input differential operation means connected respectively to current sources;

a predetermined reference voltage level connected to one input of each of said differential operation means;

wiring means connecting said pair of signal terminals to the other input of each of said differential operation means; and timer means connected to said first and second differential operation means and including a capacitor and a current source, charges accumulated in said capacitor through said current source being discharged through differential operation of said first and second differential operation means according to voltage changes of said pair of signal terminals.

7. A magnetic head circuit as set forth in claim 1, further comprising frequency divider means connected to the bases of said first pair of transistors for dividing the frequency of the data signals.

8. A magnetic head circuit as set forth in claim 7, further comprising a detector circuit connected to said frequency divider means and said pair of signal terminals for providing a timing difference between the output signals of said pair of signal terminals representing a detection of one of an undesirable short circuit and an undesirable open circuit, and a latch circuit for receiving said timing difference for latching.

9. A magnetic head circuit as set forth in claim 1, further comprising a fourth pair of transistors whose emitters are connected to each other, whose collectors are connected with resistors and which receive at their bases said data signals, level shift means whose inputs are connected to the collector of said fourth pair of transistors and which provides voltage signals shifted with respect to signals provided from the collectors of said first pair of transistors to the bases of said second pair of emitter follower transistors, and connection means for providing outputs of said level shift means to the bases of said third pair of transistors.

10. A magnetic head circuit as set forth in claim 9, further comprising a third current source connected to the emitters of said fourth pair of transistors for providing differential operation of said fourth pair of transistors on the basis of said predetermined voltage, and a fourth current source connected to the emitters of said fourth pair of transistors for providing differential operation of said fourth pair of transistors on the basis of a second predetermined voltage.

11. A magnetic head circuit as set forth in claim 9, further comprising capacitor means connected to the inputs of said level shift means.

12. A magnetic head circuit as set forth in claim 1, further comprising two transistors whose emitters are connected to the bases of said second pair of emitter follower transistors, a common connection current source connected commonly to bases of said two transistors, and a resistor connected between said current source and a power source, wherein a current flowing through said resistor and said common connection current source determines a voltage at said bases of said second pair of emitter follower transistors in response to said adjustable control signal.

13. A magnetic head circuit as set forth in claim 12, wherein said common connection current source is connected to said predetermined control voltage terminal to cause a voltage corresponding to a differential operation current flowing through said second pair of emitter follower transistors to appear at said resistor, and further comprising yet another current source connected to the common bases of said two transistors to be driven on the basis of said another predetermined voltage.

14. A magnetic head circuit as set forth in claim 1, further comprising:

a fourth pair of differential transistors whose bases are connected respectively to said pair of signal terminals and whose emitters are connected directly to each other to be operated according to a voltage appearing between said pair of signal terminals;

a current source connected to the emitters of said fourth pair of differential transistors;

first amplification transistors connected to the collectors of said fourth pair of differential transistors respectively;

post-amplifiers connected respectively to outputs of said first amplification transistors; and wires relatively long when compared with a circuit scale and connected between said first amplification transistors and said post-amplifiers.

15. A magnetic head circuit as set forth in claim 14, further comprising:

another pair of differential transistors connected to said post-amplifiers and whose emitters are connected to each other;

a current source transistor connected to the bases of said pair of differential transistors; and a switching transistor connected to the collectors of said pair of differential transistors for receiving at their bases a control signal to control the differential operation current.

16. A magnetic head circuit for magnetic head signals comprising:

a plurality of pairs of signal terminals;

a plurality of pre-amplification circuits connected respectively to said plurality of pairs of signal terminals, each of said plurality of pre-amplification circuits includes:

a pair of differential transistors whose bases are connected to associated one of said pairs of signal terminals and whose emitters are connected directly to each other and which are operated according to a voltage appearing between said pair of signal terminals;

first and second amplification transistors whose emitters are connected to one collector of said pair of differential transistors;

third and fourth amplification transistors whose emitters are connected to the other collector of another collector of said pair of differential transistors receiving at their bases a first selection signal, said second and fourth amplification transistors receiving at their bases a second selection signal;

first diodes connected to the emitters and the bases of said first and said third amplification transistors, respectively;

a current source connected to the emitters of said pair of differential transistors, and second diodes connected between bases of said pair of differential transistors and said current source, respectively;

two post-amplifiers each having two amplification transistors which receive their input signals at their emitters, said post-amplifiers being connected to two of said plurality of pre-amplification circuits; and connection wires relatively long when compared with a circuit scale and connected between said two pre-amplification circuits and said post-amplifiers, wherein the collectors of the first, second, third and fourth amplification transistors of one of said two pre-amplification circuits are connected respectively to the collectors of the corresponding transistors of the other pre-amplification circuit and also connected to one of the two amplification transistors of said two post-amplifiers, and the collectors of the first, second, third and fourth amplification transistors connected to the collectors of the differential transistors of the other pre-amplification circuit are connected respectively to the collectors of the corresponding transistors of the other pre-amplification circuit and also connected to the other of the two amplification transistors of said two post-amplifiers.

17. A magnetic head circuit as set forth in claim 16, wherein each of said two post-amplifiers includes two resistors and an output circuit connected to said two amplification transistors, and two signals obtained from said plurality of pairs of signal terminals through said two pre-amplification circuits are output at the same time through said output circuit.

18. A magnetic head circuit as set forth in claim 16, further comprising means connected in series with said current source for switching the differential operation current to operate said differential transistors in one of a plurality of pairs.

19. A magnetic head circuit as set forth in claim 18, wherein one of said two signals is a servo disk signal which is obtained from the signal terminals in one of said pairs.

20. A magnetic head circuit for magnetic head signals comprising:

a plurality of pairs of signal terminals;

a plurality of pre-amplification circuits connected respectively to said plurality of pairs of signal terminals, each of said plurality of pre-amplification circuits includes:

a pair of differential transistors whose bases are connected to an associated one of said pairs of signal terminals and whose emitters are connected directly to each other and which are operated according to a voltage appearing between said pair of signal terminals;

an amplification transistor whose emitter is connected to one collector of said pair of transistors and an amplification transistor whose emitter is connected to the other collector;

a current source connected to the emitters of said pair of differential transistors for providing a differential operation thereto; and a plurality of diodes connected in parallel between the emitters and bases of said pair of differential transistors;

post-amplifiers each having two amplification transistors which receive their input signals at their emitters and which are connected to said plurality of pre-amplification circuits; and connection wires relatively long when compared with a circuit scale and connected between said plurality of pre-amplification circuits and said post-amplifiers.

21. A magnetic head circuit as set forth in claim 20, further comprising an offset adjustment circuit having two input and memory circuits connected to the collectors of the amplification transistors connected to the collectors of the differential transistors of one and the other of said plurality of pre-amplification circuits for adjusting offset voltages in said plurality of pre-amplification circuits.

22. A magnetic head circuit as set forth in claim 21, wherein said memory circuit has therein adjustment data relating to said plurality of pre-amplification circuits.

23. A magnetic head circuit as set forth in claim 21, wherein said memory circuit has predetermined data relating to inner and outer peripheries of disk, and said offset adjustment circuit receives information on a track position on the disk and applies the received information to predetermined current signals of said post-amplifiers.

24. A magnetic head circuit as set forth in claim 21, wherein said adjustment circuit includes a pair of differential transistors, a plurality of other pairs of differential transistors whose collectors are connected to bases of said pair of differential transistors and whose emitters are connected in pairs, and a resistor ladder circuit of resistors connected to the emitters of said plurality of pairs of differential transistors, said resistors having different respective impedances.

25. A magnetic head circuit for a plurality of magnetic heads, comprising:

two emitter follower transistors for receiving magnetic head writing data;

two differential transistors connected to said two emitter follower transistors for performing differential operation control thereover; and two resistors connected to collectors of said two differential transistors for supplying a base current to said two emitter follower transistors, wherein said emitter follower transistors are connected in series with each other to perform differential switch operation over a magnetic head writing current.

* * * * *